US 6,804,688 B2

(12) United States Patent
Kobayashi et al.

(10) Patent No.: US 6,804,688 B2
(45) Date of Patent: Oct. 12, 2004

(54) DETECTING AND TRACKING NEW EVENTS/CLASSES OF DOCUMENTS IN A DATA BASE

(75) Inventors: Mei Kobayashi, Aoba-ku (JP); Loic Malassis, Paris (FR); Romanos Piperakis, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 09/844,724

(22) Filed: Apr. 27, 2001

(65) Prior Publication Data

US 2002/0007364 A1 Jan. 17, 2002

(30) Foreign Application Priority Data

May 2, 2000 (JP) ........................................ 2000-133323

(51) Int. Cl.[7] .............................................. G06F 17/30

(52) U.S. Cl. ......................... 707/203; 707/3; 707/100; 707/101

(58) Field of Search ........................ 707/1–10, 100–103, 707/200–206

(56) References Cited

U.S. PATENT DOCUMENTS 6,236,768 B1 * 5/2001 Rhodes et al. .................. 707/1
6,389,418 B1 * 5/2002 Boyack et al. .................. 707/6

OTHER PUBLICATIONS

Yang et al. ("Learning Approaches for Detecting and Tracking News Events", IEEE Jul./Aug. 1999, pp. 32–43).*
"Topic Detection and Tracking Pilot Study Final Report" Proceedings of the DARPA Broadcast News Transcription and Understanding Workshop, 1998 James Allan et al.

IEEE Intelligent Systems & their applications, (Guest Editors' Introduction)"Intelligent Informaton Retrieval" Yiming Yang & Jan Pedersen pp 30–31, Jul./Aug. 1999.

IEEE Intelligent Systems & their applications, Intelligent Information Retrieval "Learning Approaches for Detecting and Tracking News Events" Yiming Yang et al pp. 32–43, Jul./Aug. 1999.

IEEE Intelligent Systems & their applications, Intelligent Information Retrieval "Maximizing Text–Mining Performance" Sholom M. Weiss et al pp 63–69, Jul./Aug. 1999.

Informedia Digital Video Library Research at Carnegie Mellon Univ. http://www.informedia.cs.cmu.edu/ Copyright 2000.

Informedia–I Digital Video Library Project http://www.informedia.cs.cmu.edu/dli1/ Copyright 2000.

Informedia–II Auto Summarization and Visualization Across Multiple Video Documents and Libraries http://www.informedia.cs.cmu.edu/dli2/ Copyright 2000.

Proc. DARPA Broadcast News Workshop Feb. 28–Mar. 3, 1999 DARPA BNN Workshop Table of Contents http://www.itl.nist.gov/iaui/894.01/proc/darpa99/.

(List continued on next page.)

Primary Examiner—Jean M. Corrielus
Assistant Examiner—Joon Hwan Hwang
(74) Attorney, Agent, or Firm—Thu Ann Dang; Anne V. Dougherty

(57) ABSTRACT

Detecting and tracking of new events/classes of documents are disclosed. A method for detecting new events and/or classes of documents and tracking evolution thereof in a database, said new events and/or classes of said documents being added to said database, said documents including attribute data related to a temporal parameter, said method includes the steps of providing vectors of said documents related to attribute data including said temporal parameter included therein, and detecting said new events and classes and tracking the evolution thereof using said vectors.

31 Claims, 21 Drawing Sheets

OTHER PUBLICATIONS

Proc. DARPA Broadcast News Workshop Feb. 28–Mar. 3, 1999 DARPA BNN Workshop Abstracts http://www.itl.nist.gov/iaui/894.01/proc/darpa99/html/abstract.htm.

Proc. DARPA Broadcast News Workshop Feb. 28–Mar. 3, 1999 "Dragon Systems' Automatic Transcription of New TDT Corpus" L. Gillick et al, http://www.itl.nist.gov/iaui/894.01/proc/darpa99.

Proc. DARPA Broadcast News Workshop Feb. 28–Mar. 3, 1999 "Topic Detection & Tracking (TDT) Overview & Perspective" Charles L. Wayne. http://www.itl.nist.gov/iaui/894.01/proc/darpa98/html/tdl10/tdt10.htm.

Proc. DARPA Broadcast News Workshop Feb. 28–Mar. 3, 1999 "The Topic Detection and Tracking Phase 2 (TDT2) Evaluation Plan" George Doddington http://www.itl.nist.gov/iaui/894.01/proc/darpa98/htm/tdt60/tdt60.htm.

Proc. DARPA Broadcast News Workshop Feb. 28–Mar. 3, 1999 "GETRACKER: A Robust, Lightweight Topic Tracking System"T. Strzalkowski et al http://www.itl.nist.gov/iaui/894.01/proc/darpa99.

Proc. DARPA Broadcast News Workshop Feb. 28–Mar. 3, 1999 "The Beta–Binomial Mixture Model and Its Appliction to TDT Tracking and Detection "Stephen A. Lowe http://www.itl.nist.gov/iaui/894.01/proc/darpa99.

Proc. DARPA Broadcast News Workshop Feb. 28–Mar. 3, 1999 "Topic Tracking in a News Stream" J.P. Yamron et al http://www.itl.nist.gov/iaui/894.01/proc/darpa99.

Proc. DARPA Broadcast News Workshop Feb. 28–Mar. 3, 1999 "UMASS Approaches to Detection and Tracking at TDT2" Ron Papka et al http://www.itl.nist.gov/iaui/894.01/proc/darpa99.

Proc. DARPA Broadcast News Workshop Feb. 28–Mar. 3, 1999 "NIST'S 1998 Topic Detection and Tracking Evaluation (TDT2)"J. Fiscus et al http://www.itl.nist.gov/iaui/894.01/proc/darpa99.

Proc. DARPA Broadcast News Workshop Feb. 28–Mar. 3, 1999 "A Cluster–Based Approach to Tracking, Detection and Segmentation of Broadcast News" D. Eichmann et al http://www.itl.nist.gov/iaui/894.01/proc/darpa99.

Proc. DARPA Broadcast News Workshop Feb. 28–Mar. 3, 1999 "Topic Detection in Broadcast News" F. Walls et al http://www.itl.nist.gov/iaui/894.01/proc/darpa99.

* cited by examiner

CREATION OF DOCUMENT MATRIX

```
<REUTERS>
  <DATA> </DATA>
  <TOPIC> </TOPIC>
  <PLACE> </PLACE>
  <PEOPLE> </ORG>
  <COMPANY> </COMPANY>
  <TEXT> </TEXT>
     <TEXT> title </TITLE>
     <DATELINE> 1st january </DATELINE>
     <BODY> ....... </BODY>
  </TEXT>
</RETURN>
```

Keyword Generation ← → Formatting Document

*FIG. 7(a)*

```
ID   YYYYMMDD DocNumber
TI title
CT text line 1
CT text line 2
CT .....

ID YYYYMMMDD
```

*FIG. 7(b)*

FIG. 20 doc reference: $doc^{layer}_{number}$ coincidence between 2 docs: $c^{layer\ 1\ layer\ 2}_{number\ 1\ number\ 2}$ global coincidence: $c^{layer}_{number}$ threshold: $\varepsilon$
attenuation: $\eta_i$ for the $i^{th}$ layer

DETECTING AND TRACKING NEW EVENTS/CLASSES OF DOCUMENTS IN A DATA BASE

FIELD OF THE INVENTION

The present invention relates to detecting and tracking evolution of new events and/or classes of documents in a large database, and more particularly relates to a method, a system, and a program product for detecting and tracking the evolution of the new events and/or classes of the documents in a very large database by simultaneously taking into account a temporal parameter such as time, a date, or a year and any combinations thereof in a vector modeled document.

BACKGROUND OF THE ART

Recent database systems must handle increasingly large amounts of data, such as news data, client information, stock data, etc. Users of such databases find it difficult to search desired information quickly and effectively with sufficient accuracy. Therefore, timely, accurate, and inexpensive detection of new topics and/or events from large databases may provide very valuable information for many types of businesses including, for example, stock control, futureS and options trading, news agencies which may afford to quickly dispatch a reporter without affording a number of reporters posted worldwide, and businesses based on the Internet or other fast paced actions which need to know major and new information about competitors in order to succeed thereof.

Conventionally, detection and tracking of new events in enormous databases is expensive, elaborate, and time consuming work, because a searcher of the database usually needs to hire extra persons for monitoring thereof.

Recent detection and tracking methods used for search engines mostly use a vector model for data in the database in order to cluster the data. These conventional methods generally construct a vector q (kwd1, kwd2, . . . kwdN) corresponding to the data in the database. The vector q is defined as the vector having the dimension equal to numbers of attributes, such as kwd1, kwd2, . . . kwdN which are attributed to the data. The most commonly used attributes are keywords, i.e., single keywords, phrases, names of person(s), place(s). Usually, a binary model is used to create the vector q mathematically in which the kwd1 is replaced to 0 when the data do not include the kwd1, and the kwd1 is replaced to 1 when the data include the kwd1. Sometimes, a weight factor is combined to the binary model to improve the accuracy of the search. Such weight factor includes, for example, appearance times of the keywords in the data.

In such vector model of the database, conventionally the clustering of the data in the database is first carried out based on the keywords. The procedure of the clustering mostly uses the scalar product of the vector q. In the clustering of the data, each vector corresponding to the data in the database is categorized into some clusters having a predetermined range of the scalar product. Then the clusters are further clustered using a date/time stamp attributed to the data for detecting and tracking the new event. The conventional search method uses a two-step clustering process for detecting and tracking the new events as described above, and therefore, the search procedure becomes elaborate and expensive work.

Therefore, there are needs for providing a system implemented with a novel method for detecting new events and/or classes and tracking evolution of the new events in an inexpensive and automatic manner.

DESCRIPTION OF RELATED ART

In "Maximizing text-mining performance", IEEE Intelligent Systems, July/August, 1999, pp. 1307–1313 by S. Weiss et al. at IBM T. J. Watson Laboratory, a method for detecting and tracking new events, which uses a combination of decision tree algorithms and adaptive sampling, is disclosed. The method disclosed by Weiss et al. may provide a method for detecting and tracking new events, but has the disadvantage of requiring training sets of sample documents to compile a dictionary.

In "Topic detection and tracking pilot study final report", Proc. of the DARPA Broadcast News Transcription and Understanding Workshop, February, 1998, Morgan Kaufmann San Francisco, pp. 194–218, 1998, by J. Allan et al., at University of Massachusetts, Amherst, CMU, "Dragon Systems" a probabilistic (Hidden Markov Model) approach is used to cluster documents based on words and sentences in articles. In the "Dragon Systems", there is also the disadvantage of requiring a training set to start the system. UMass (University of Massachusetts) uses a content based LCA (local content analysis) method, and this method is very slow so that the search speed becomes unacceptably slow. The Carnegie-Mellon University's system is directed to search multimedia data such as audio news and video data. It is based on probabilistic methods.

In "Intelligent Information Retrieval", IEEE Intelligent Systems, July/August, 1999, pp. 30–31 by Y. Young et al., a method which uses a group average clustering and an independent time stamp-weighting factor is disclosed. The weighting factor is also disclosed in "Clustering algorithms", pp. 419–442 in W. Frakes and R. Baeza-Yates (Editor), "Information Retrieval: data structures and algorithms", Prentice-Hall, Englewood Cliffs, N.J., 1992, and E. Rasmussen and "Recent trends in hierarchic clustering: a critical review", Information Processing and Management, Vol. 24, No. 5, pp. 577–597, 1988.

In "CMU Infomedia-KNN-based Topic Detection": http://www.informedia.cs.cmu.edu./HDWBerk/ tsld001.htm, a training index with pre-labeled topics is provided.
The detail is:
- 45000 broadcast News stories from 1995 to 1996,
- 3178 different news topics occurring appeared larger than 10 times
- Search for top 10 related stories in training index
- Lookup topics for related stories
- Re-weight topics by story relevance (select top 5)
- At 5 topics, Recall is reported to be 0.491 and Relevance is reported to be 0.482

In "NIST Topic Detection and Tracking Evaluation Project":
http://www.itl.nist.gov/iaui/894.01/proc/darpa98/index.htm, U.S. National Institute of Standard and Technology (NIST) discloses the results conducted in 1997Xg as listed in Table I.

TABLE I*

| RUN | % Miss | % f/a | % Recall | % Prec |
|---|---|---|---|---|
| CMU1 | 38 | 0.09 | 62 | 67 |
| CMU2 | 17 | 0.32 | 83 | 43 |
| Dragon | 39 | 0.08 | 61 | 69 |

TABLE I*-continued

| RUN | % Miss | % f/a | % Recall | % Prec |
|---|---|---|---|---|
| UMass1 | 66 | 0.09 | 34 | 53 |
| UMass2 | 67 | 0.5 | 33 | 16 |

*% Miss denotes miss rate,
% f/a denotes false alarm rate,
% Recall denotes recall rate, and
% Prec denotes precision rate.
In "DARPA Broadcast News Workshop":
http://www.itl.nist.gov/iaui/894.01/proc/darpa99/index.htm, a dozen or so reports US institutions which received funding for event tracking and detection are described (TDT2: Topic Detection and tracking 1998).

SUMMARY OF THE INVENTION

An object of the present invention is to provide a novel method for detecting new events and/or classes of the documents and tracking evolution thereof in a database.

Another object of the present invention is to provide a novel system for detecting new events and/or classes of the documents and tracking evolution thereof in a database.

Further, another object of the present invention is to provide a novel program product for detecting new events and/or classes of the documents and tracking evolution thereof in a database.

The present invention essentially utilizes a novel method for detecting and tracking of the new events and/or classes of the documents in a very large database simultaneously taking into account a time stamp parameter such as date and time in a vector modeled document.

In a first aspect of the present invention, a method for detecting new events and/or classes of documents and tracking evolution thereof in a database, said new event and/or classes of said documents being added to said database, said documents including attribute data related to a temporal parameter, said method comprises steps of:

providing vectors of said documents based on attribute data simultaneously including said temporal parameter included in said document, and detecting said new events and/or classes of said documents and tracking evolution thereof simultaneously using said vectors.

In the first aspect of the present invention, said attributed data may include at least one keyword, and said keyword is weighted with respect to a frequency of appearance in said document.

In the first aspect of the present invention, said detecting and tracking step may further include a step of providing a temporal window such that said detecting and tracking step is executed using said temporal window.

In the first aspect of the present invention, said temporal window may be a delta function with respect to a specific date.

In the first aspect of the present invention, said temporal window may be a symmetric Gaussian function.

In the first aspect of the present invention, said temporal window may be a step function In the first aspect of the present invention, said temporal window may be formed interactively by a user on a display window.

In the first aspect of the present invention, said temporal parameter may be further weighted with respect to time elapse about a specific date, and a weight of said temporal parameter may be less than the total weight of said keywords.

In the first aspect of the present invention, said temporal window may be normalized before dimensional reduction for said vectors may be carried out if the number of said keywords in each document is relatively constant in said database and the same temporal window is used for all of the documents.

In the first aspect of the present invention, several different temporal windows may be provided so that the relative weights between said keywords and said temporal parameter becomes relatively constant from document to document if the number of said keywords in each document varies greatly.

In a second aspect of the present invention, a computer system including a database to which new events and/or classes of documents are added, said documents including data related to a temporal parameter, and detecting new events and/or classes of said documents and tracking evolution thereof being executed in said computer system comprises:

means for providing vectors of said documents based on attribute data simultaneously including said temporal parameter included in said document, and means for detecting said new events and/or classes of said documents and tracking evolution thereof simultaneously using said vectors.

In the second aspect of the present invention, said attributed data may include at least one keyword, and said keyword is weighted with respect to a frequency of appearance in said documents.

In the second aspect of the present invention, said detecting and tracking means may further include means for providing a temporal window such that said temporal window is used by said detecting and tracking means.

In the second aspect of the present invention, said temporal window may be a delta function with respect to a specific date.

In the second aspect of the present invention, said temporal window may be a symmetric Gaussian function.

In the second aspect of the present invention, said temporal window may be a step function.

In the second aspect of the present invention, said temporal window may be formed interactively by a user on a display window.

In the second aspect of the present invention, said temporal parameter may be further weighted with respect to time elapse about a specific date, and a weight of said temporal parameter may be less than the total weight of said keywords.

In the second aspect of the present invention, said temporal window may be normalized before dimensional reduction for said vectors is carried out if the number of said keywords in each document is relatively constant in said database and the same temporal window is used for all of the documents.

In the second aspect of the present invention, several different temporal windows may be provided so that the relative weights between said keywords and said temporal parameter may become relatively constant from document to document if the number of said keywords in each document varies greatly.

In the second aspect of the present invention, said computer system may comprise a server and at least one client, and said detection and tracking step may be requested from at least one client computer which transmits to said server and receives a result from said detection and tracking step.

In a third aspect of the present invention, a program product for detecting new events and/or classes of documents and tracking evolution thereof in a database, said new events and/or classes of said documents being added to said database, said documents including attribute data related to a temporal parameter, said method comprising steps of:

providing vectors of said documents based on attribute data simultaneously including said temporal parameter included therein, and detecting said new events and/or classes of said documents and tracking evolution thereof simultaneously using said vectors.

In the third aspect of the present invention, said attributed data include at least one keyword, and said keyword may be weighted with respect to a frequency appeared in said documents.

In the third aspect of the present invention, said detecting and tracking step may further include a step of providing a temporal window such that said detecting and tracking step is executed using said temporal window.

In the third aspect of the present invention, said temporal window may be a delta function with respect to a specific date.

In the third aspect of the present invention, said temporal window may be a symmetric Gaussian function.

In the third aspect of the present invention, said temporal window may be a step function.

In the third aspect of the present invention, said temporal window may be formed interactively by a user on a display window.

In the third aspect of the present invention, said temporal parameter may be further weighted with respect to time elapse from a specific date, and a weight of said temporal parameter may be less than the total weight of said keywords.

In the third aspect of the present invention, said temporal window may be normalized before dimensional reduction for said vectors is carried out if the number of said keywords in each document is relatively constant in said database and the same temporal window is used for all of the documents.

In the third aspect of the present invention, several different temporal windows may be provided so that the relative weight between said keywords and said temporal parameter may become relatively constant from document to document if the number of said keywords in each document varies greatly.

The present invention will be further understood by explaining the following non-limiting embodiments of the present invention along with drawings thereof.

BRIEF DESCRIPTION OF THE DRAWINGS

FIG. 7($a$) shows a representative procedure for forming the document matrix and FIG. 7($b$) shows the converted format of the document.

FIGS. 17–21 show typical GUIs displayed in the computer system.

BEST MODE FOR CARRYING OUT THE INVENTION

A method of the present invention may be used to detect new events and/or new classes of documents and to track evolution thereof in a database, more preferably in a very large database. New data and/or documents may be added to the database in appropriate time intervals such as, daily, weekly, monthly, or even annually. The present invention may be especially effective to detect new events and/or classes of the documents and tracking evolution thereof in such databases. The method of the present invention essentially is based on a vector space model of documents wherein a temporal parameter, i.e., the date/time stamp, is allowed to be treated as if the temporal attribute(s) were keyword attributes in an algorithm for clustering the documents and in reducing noises applied to the document-attribute matrix, e.g., latent semantic indexing, statistical method.

Detection and Tracking of New Events/Classes
Definition of Terms

Temporal parameter: the term "temporal parameter" means a parameter or an attribute included in the document, and contains information related to time such as time, date, year, and any combinations therebetween.

Date/time stamp: the term "date/time" stamp means a value derived from the temporal parameter and consists of an element of a combined matrix described hereinbelow.

Document matrix (vector): the term "document matrix (vector)" means a matrix or vector created from attributes, e.g., keywords, key phrases, names, etc., included in the documents.

Combined matrix (vector): the term "combined matrix (vector)" means a matrix or vector generated by adding the date/time stamps corresponding to the documents to the document matrix.

Temporal window: the term "temporal window" means a window to weight the date/time stamps utilized when detecting new events and/or classes and tracking evolution of the new events.

1. Combined Matrix

Figure 1:
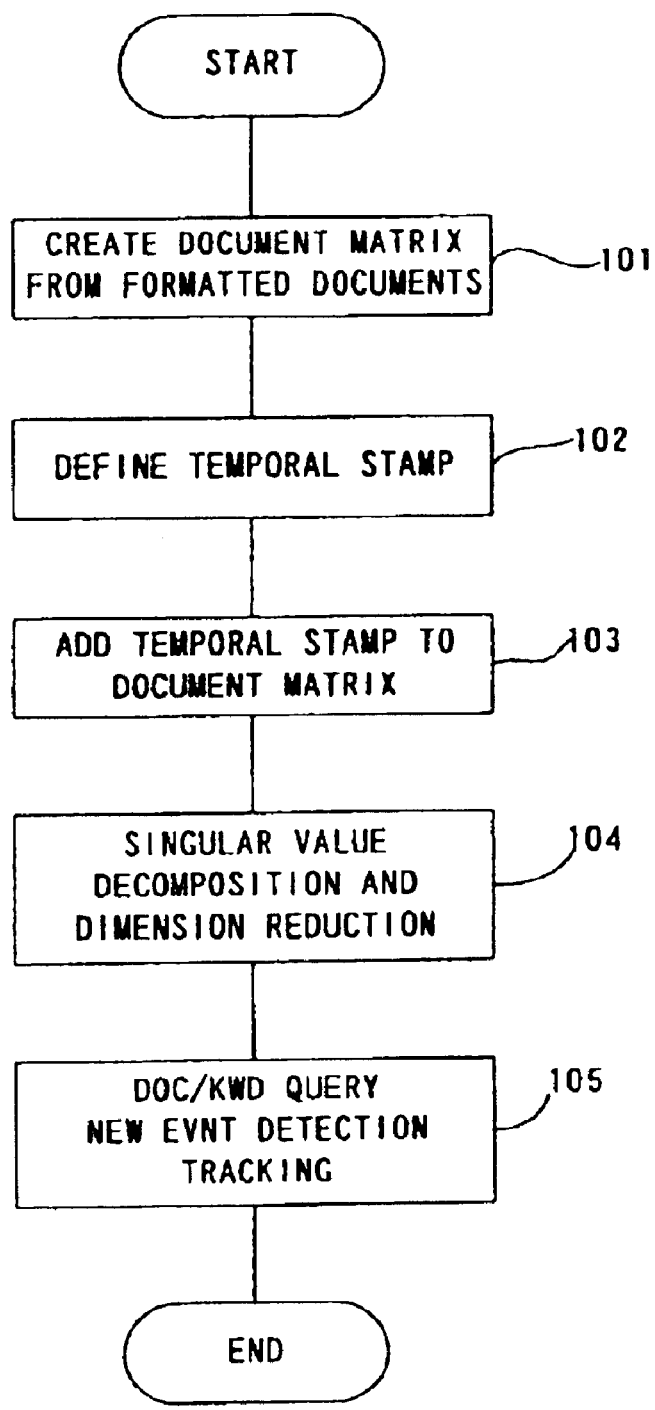
FIG. 1 shows a representative procedure to incorporate the temporal attributes into the document matrix.

A flow chart of an embodiment of the procedure according the present invention to include the temporal attributes into the matrix of the document is shown in FIG. 1. In FIG. 1, the procedure proceeds to step 101 and creates a document matrix from a document in a certain format using the vector model. The detail of elements in the vector will be discussed later. There is no substantial limitation for documents in the present invention, and documents in any format, such as, a text data, and image data, and audio or visual data may be used in the present invention so far as the keywords of the same kinds and the temporal parameters are positioned in a predetermined syntax.

Referring to FIG. 1, the procedure proceeds to step 102 wherein the date/time stamp is defined from the documents such as time, date, month, and year which are included in the temporal parameter. The procedure proceeds to step 103 and adds the date/time stamp to the previously obtained document matrix to create the combined matrix. This additional step may be carried out by any method well-known in the art.

Referring to FIG. 1, the procedure further proceeds to step 104 and executes singular value decomposition and dimension reduction of the combined matrix for realizing the search such as Doc/kwd query, New Event Detection, and Tracking of step 105.

Figure 2:
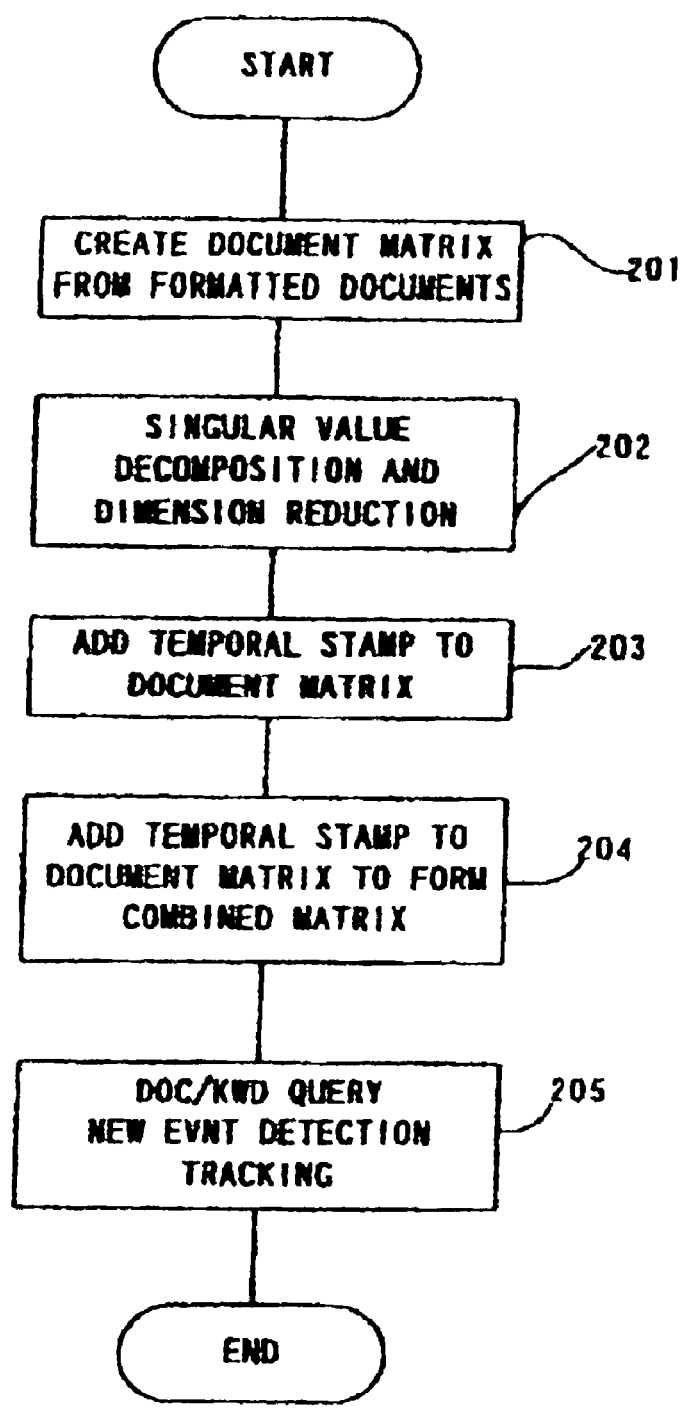
FIG. 2 shows an alternative procedure to incorporate the temporal attributes into the document matrix.

FIG. 2 shows another embodiment of the procedure to combine the temporal parameter into the document matrix. The procedure shown in FIG. 2 proceeds to step 201 and first creates the document matrix. Next, the procedure executes singular value decomposition and dimension reduction in step 102. Then the procedure proceeds to step 103 and defines the date/time stamp from temporal parameters such as time, date, month, or year.

The procedure proceeds to step 104 and adds the date/time stamp to the document matrix in step 204 to create the combined matrix used for the search such as Doc/kwd query, new Event Detection, and Tracking of step 205.

As described in FIGS. 1 and 2, the combined matrix used in the present invention may be created any time before the steps of the search 105 and 205 depending on system environments and programming facilities as easily appreciated to a person skilled in the art.

Figure 3:
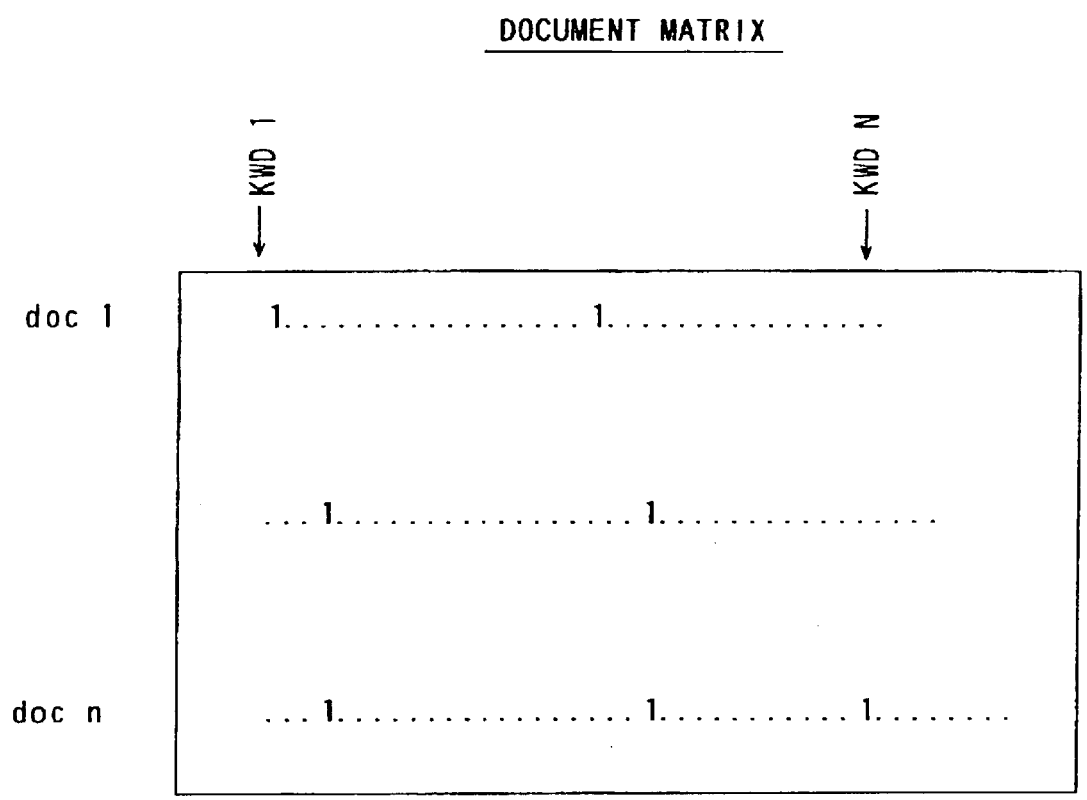
FIG. 3 shows an example of the document matrix.

FIG. 3 shows an example of the document matrix. The matrix comprises columns from document 1 (doc 1) to document n (doc n) which include elements derived from the keywords (kwd 1 . . . kwd n) included in the particular document. Numbers of documents and numbers of keywords are not limited in the present invention, and depend on the documents and size of the database. In FIG. 3, the elements of the document matrix are represented by the numerals 1, however other positive natural numbers may be used as described hereinbelow when weighting factors are used to create the document matrix.

Figure 4:
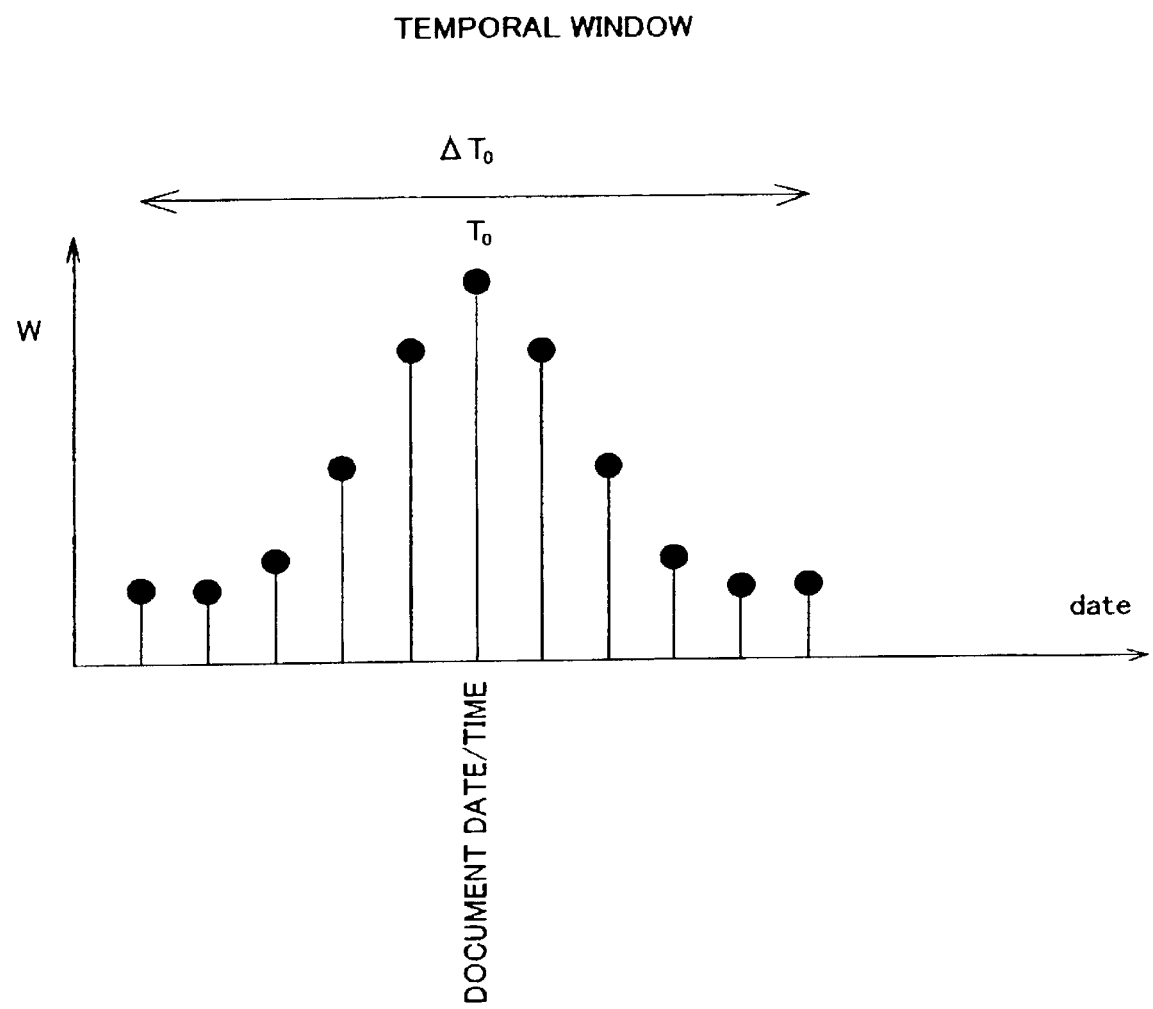
FIG. 4 shows a temporal window having a symmetric Gaussian shape.

FIG. 4 shows a typical temporal window applied to the date/time stamp and simultaneously weighting thereof. The temporal window shown in FIG. 4 is a symmetric Gaussian function with maximum height W at the $T_0$. Here, $T_0$ corresponds to a specific date/time of the specific document and the height corresponds to the weighting factor. This type of the window may be used to detect new events and/or classes about the specific point $T_0$ with a weighting factor which is decreasing with respect to the time duration centered to $T_0$. Other temporal windows available in the present invention may include a delta function, a step function, etc., depending on purposes of the search. The temporal window will be further discussed hereinafter.

Figure 5:
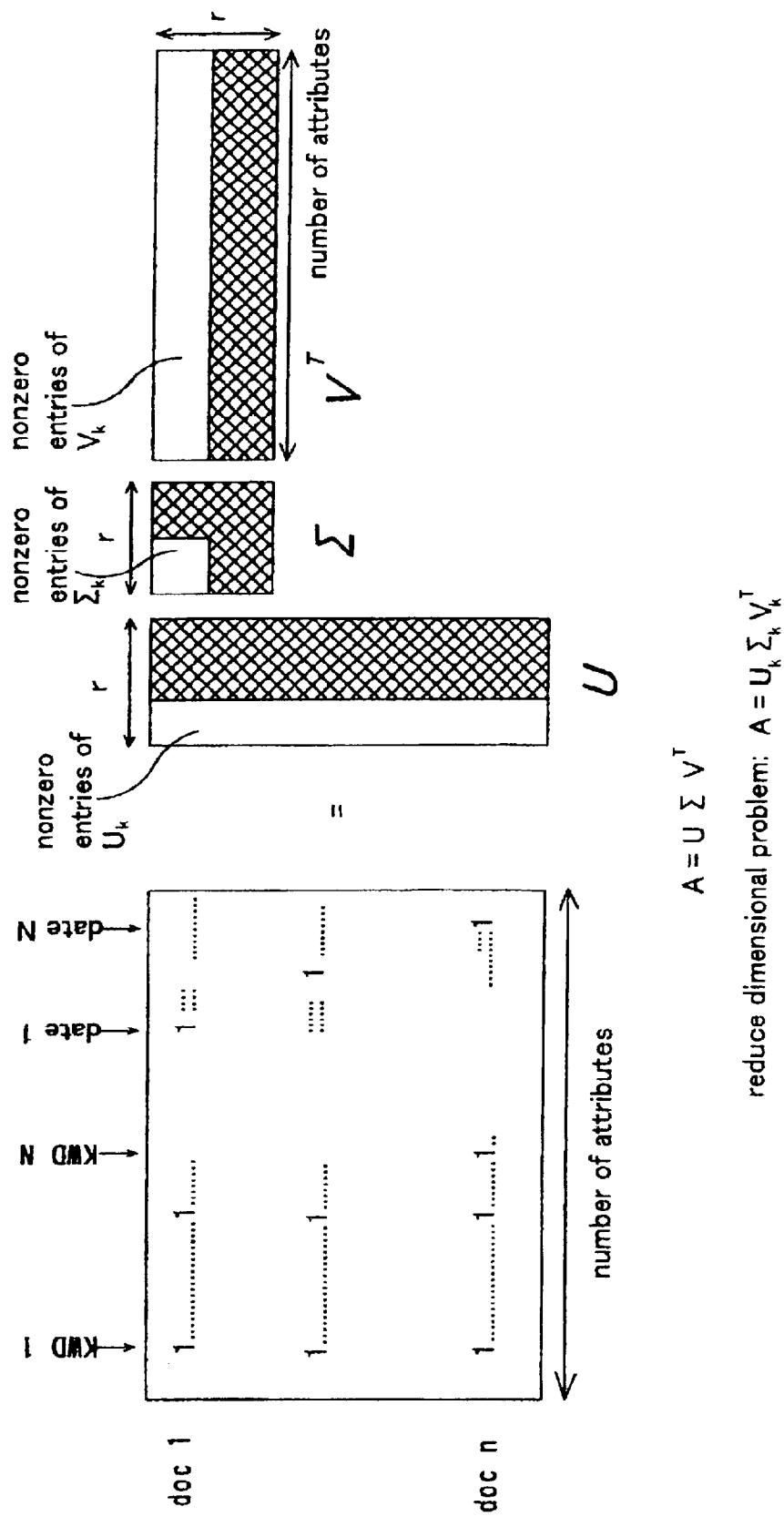
FIG. 5 shows a representative construction of matrices U, S, and $V^T$, and matrices $U_K$, $S_K$, and $V_K^T$ with reduced dimension.

FIG. 5 shows constructions of matrices, U, S, and $V^T$ obtained in the singular value decomposition and dimension reduction in steps 104 and 202 in FIGS. 1 and 2. Elements of the matrix within the marked region are set to be 0 in order to reduce the dimension of the matrix of the document, through the procedure for the singular value decomposition and dimension reduction which may be carried out using well-known methods in the art.

Figure 6:
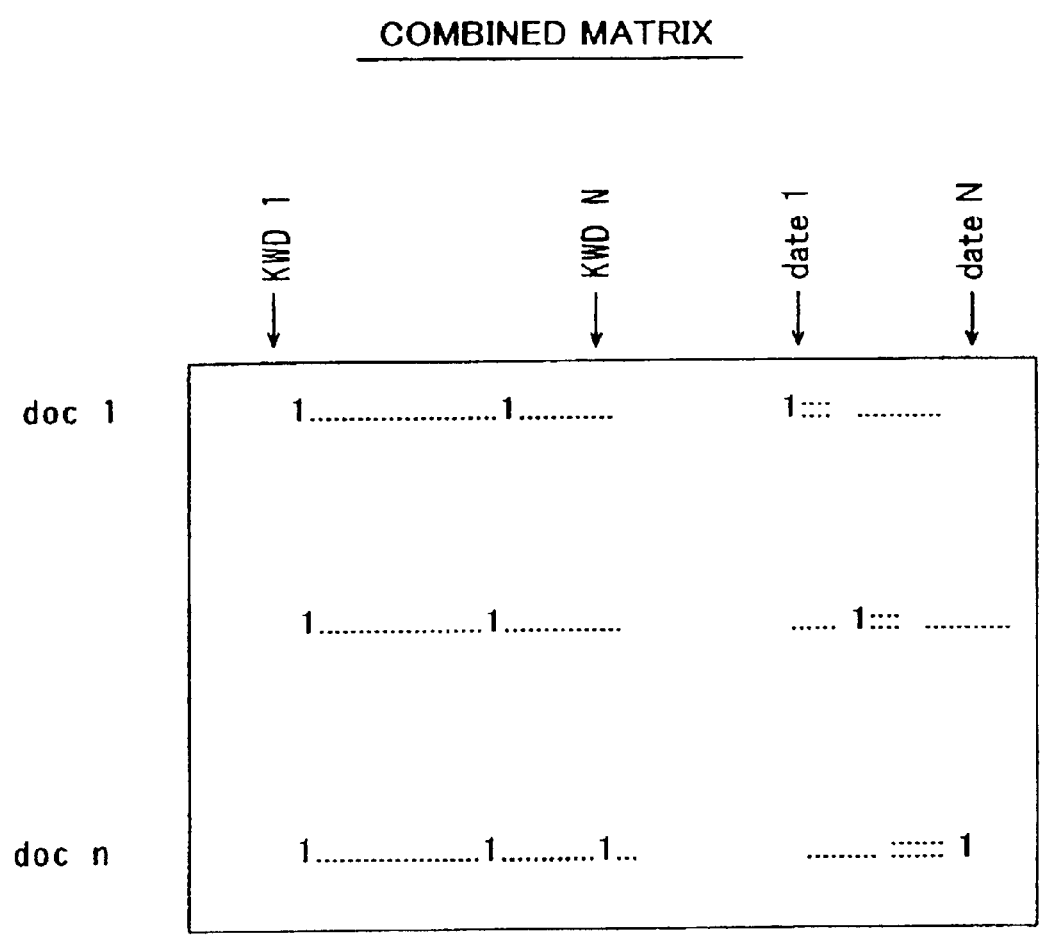
FIG. 6 shows a representative embodiment of the combined matrix.

In FIG. 6, an embodiment of the combined matrix obtained by adding the time/date stamp to the document matrix is depicted. The combined matrix comprises the elements originally included in the document matrix followed by the elements used as the time/date stamp. The elements are given by a numeral 1 in FIG. 16, however, other natural numbers may be present as the elements when weighting factors are used to create the combined matrix. Such adding step may also be performed in any way well-known in the art.

In FIG. 7, a procedure for forming the document matrix is shown. In FIG. 7(a), a document written under SGML format is assumed. The method of the present invention generates keywords based on the document with which detection and tracking are executed and then converts the format of the document into another format, such as, for example, shown in FIG. 7(b), suitably used in the method according to the present invention. Formats of the documents are not limited to SGML, and other formats may be used in the present invention.

A procedure of the attributes generation is now described. In the example, attributes are considered to be keywords. Keywords generation may be performed as follows:
(1) Extract words with capital letters
(2) Ordering
(3) Calculate number of occurrence: n
(4) Remove word if n>Max or n<Min
wherein Max denotes a predetermined value for maximum occurrence per keyword, and Min denotes a predetermined value for minimum occurrence per keyword. The process listed in step (4) may often be effective to improve accuracy. There is not a substantial limitation on the order of executing the above procedures, and the order of the above process may be determined considering system conditions used, and programming facilities. This is one example of a keyword generation procedure. There may be many other procedures possible used in the present invention.

Figure 8A:
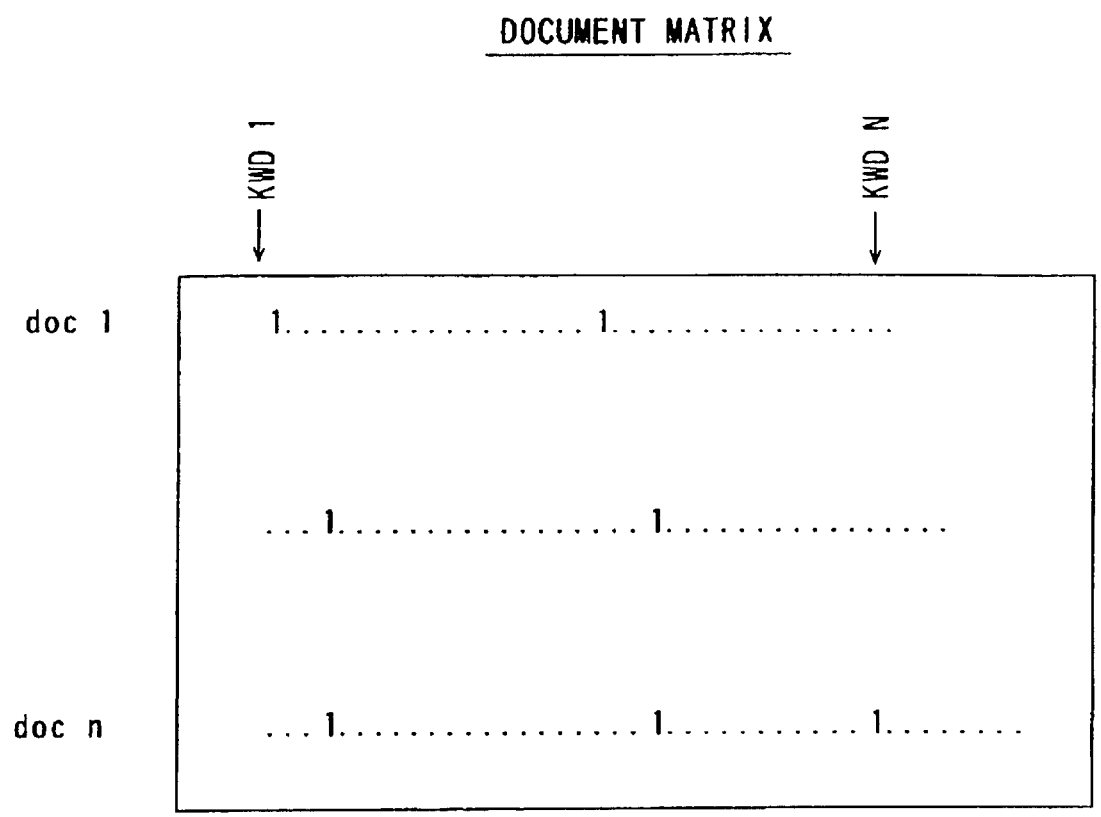
FIG. 8 shows the document matrix (a) and the detail of the combined matrix (b).

After generating the keywords and converting the SGML format, the document matrix thus built is shown in FIG. 8(a). A sample pseudo code for creating the document vector/matrix without using a weighting factor and/or function is as follows:

REM: No Weighting factor and/or function
If kwd(j) appears in doc (i)
Then M(i,j)=1
Otherwise M(i,j)=0

The similar procedure may be applied to the temporal parameter, whereas the following pseudo code may be used:

If time/date stamp equal to a specific time/date/year in doc (i)
Then W(i)=1
Otherwise W(i)=0

Figure 8B:
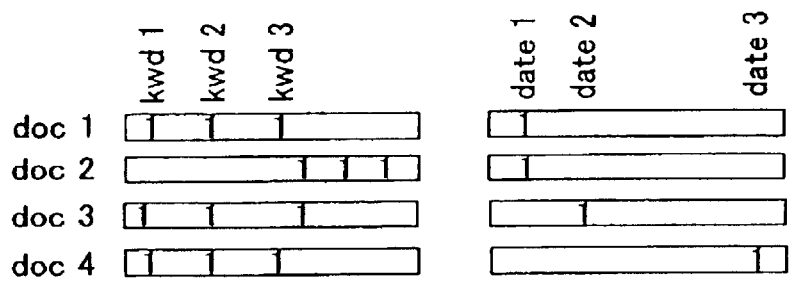

FIG. 8(b) shows detail of vectors in the combined matrix created from keywords simultaneously including the date/time stamp.

The present invention may use a weighting factor and/or a weighting function with respect to both of the keywords and the temporal parameters when the combined matrix is created. The weight factor and/or the weight function for the keyword $W_K$ may include an occurrence time of the keywords in the document, a position of the keyword in the document, whether or not the keyword being described is in capital letters, but is not limited thereto. A weighting factor and/or weighting function $W_T$ for the temporal parameter may also be applied to obtain the time/date stamp as well as the keyword according to the present invention. The weight factor $W_K$ may be used for each keyword, and the weight factor $W_T$ may be used together with a number of $W_K$'s as far as the detection and tracking according to the present invention are possible. However, for the purpose of the detection of new events and/or classes and tracking of evolution of new events, a ratio of the total of the weight factor $W_K$ must be less than $W_T$ so as to obtain good results relevant to the time/date dependent topics. It may be possible to provide several different temporal windows so that the relative weight between the keywords and the temporal parameter becomes relatively constant from document to document if the number of said keywords in each document varies greatly.

2. Ranking of the Documents

According to the present invention, several procedures to rank the document relative to the keyword and the time/date stamp together with the weight factors may be possible, and therefore the detection and tracking method/system of new events and/or classes is enhanced with respect to conventional search engines for the databases which first cluster the document matrix only created by keywords. Although the present invention may provide the result which picks up new events such as, for example, ten events from the top of the new event and/or classes hit, accuracy of the search, i.e., detection and tracking of new events and/or classes may be increased since the method according to the present invention creates the combined matrix simultaneously including the temporal attribute.

Figure 9:
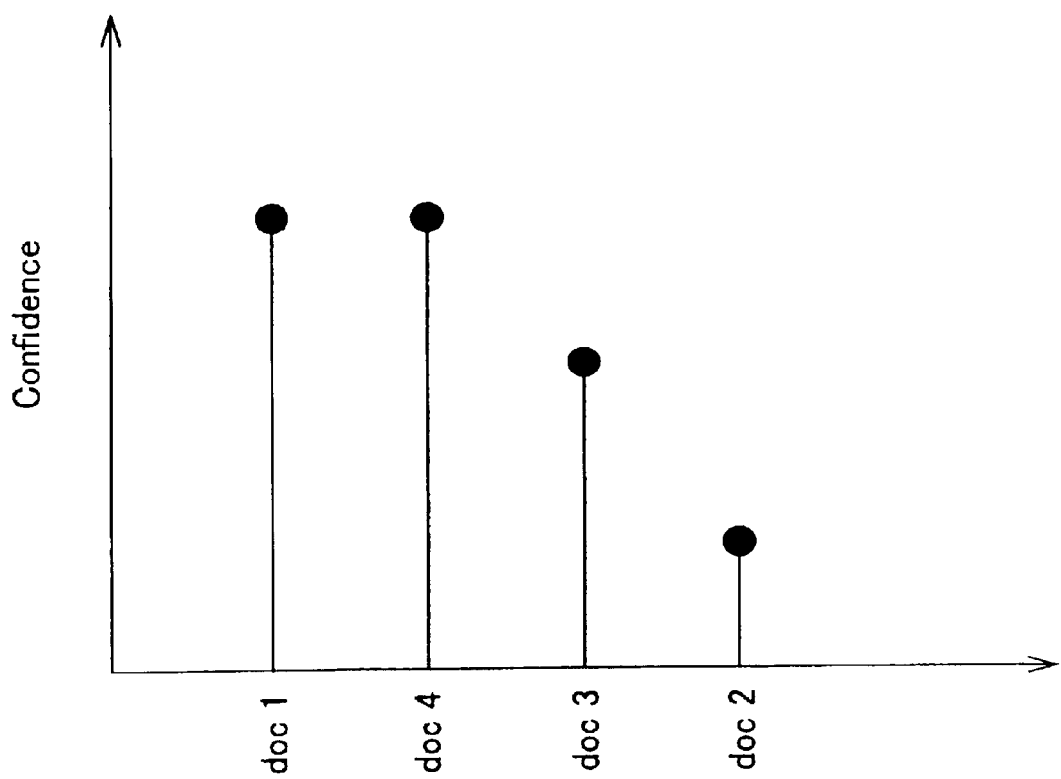
FIG. 9 shows a result of the detection and tracking.

Typical results of the detection and tracking of new events and/or classes are shown in FIG. 9. In FIG. 9, the documents with the highest associated confidence doc 1 and doc 4 for a search query without considering the temporal attribute, which corresponds to a simple keyword search, are indicated by the longest lines and second and third documents doc 3 and doc 2 with lower confidences are indicated by shorter lines.

Figure 10:
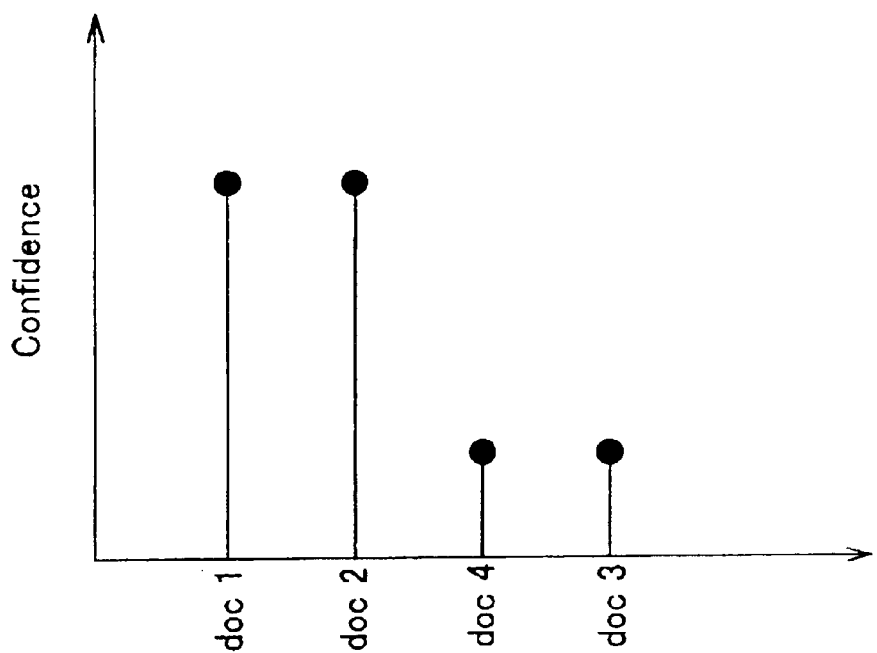
FIG. 10 shows a result of the detection and tracking.
Figure 11:
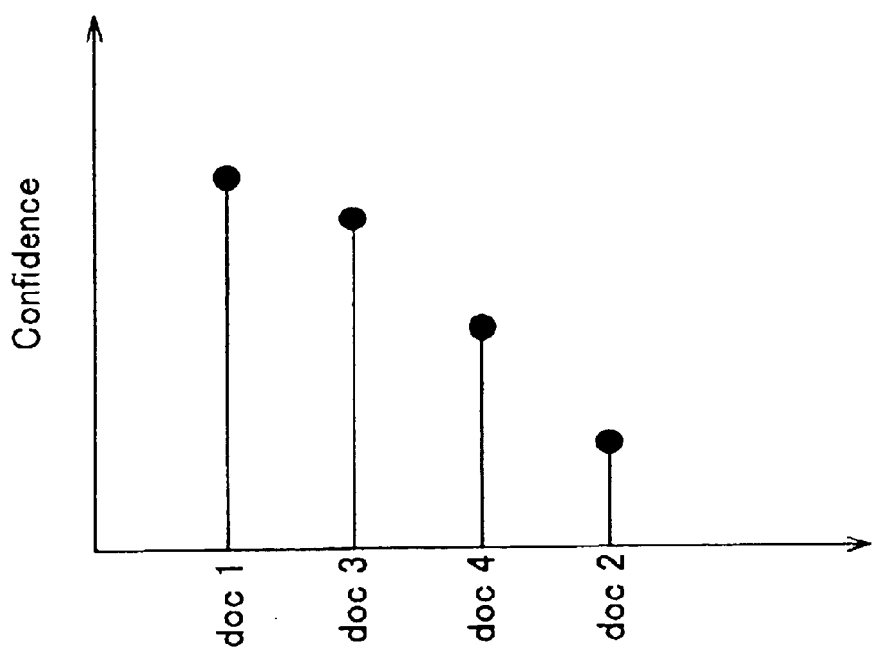
FIG. 11 shows a result of the detection and tracking.

FIGS. 10 and 11 show results of the search when the search query includes the date/time stamps. Weighting factors on the date/time stamps are different between FIG. 10 and FIG. 11. FIG. 10 shows the result of the search using the query with a high weighting factor for the date/time stamp among the same documents described in FIG. 9.

As shown in FIG. 10, document doc 1 is still most relevant to the query, and document doc 2 becomes the document with the second highest associated confidence due to the time/date stamp used, and therefore, its relative order becomes higher than the documents doc 3 and doc 4. Since document doc 3 has the lowest confidence due to the date/time stamp used, its rank is lowered in the embodiment described in FIG. 10.

Alternatively, FIG. 11 shows the result of the search using a different query with medium weighting factor for the time/date stamp. Since document doc 1 still has the highest confidence with respect to the keywords and the time/date stamp, document doc 1 is placed in the left most position. However, the ranking of document doc 3 becomes higher than the ranking shown in FIG. 10 because of the medium weight on the date/time stamp. Since document doc 3 has better confidence to the keywords than document doc 2 as shown in FIG. 9, and the search query has the time/date stamp with a medium weight factor, the ranking of document doc 3 becomes higher than the document doc 2 and doc 4 as shown in FIG. 11. The document doc 4 matches well to the keywords included in the query compared with document doc 3 as shown on FIG. 9, however, document doc 4 has relatively low relevancy to the date/time stamp thereby document doc 4 being ranked lower than document doc 3. As described above, the present invention may provide significant improvement on the detection of new event/classes and tracking evolution of new events/classes in a database.

Figure 12:
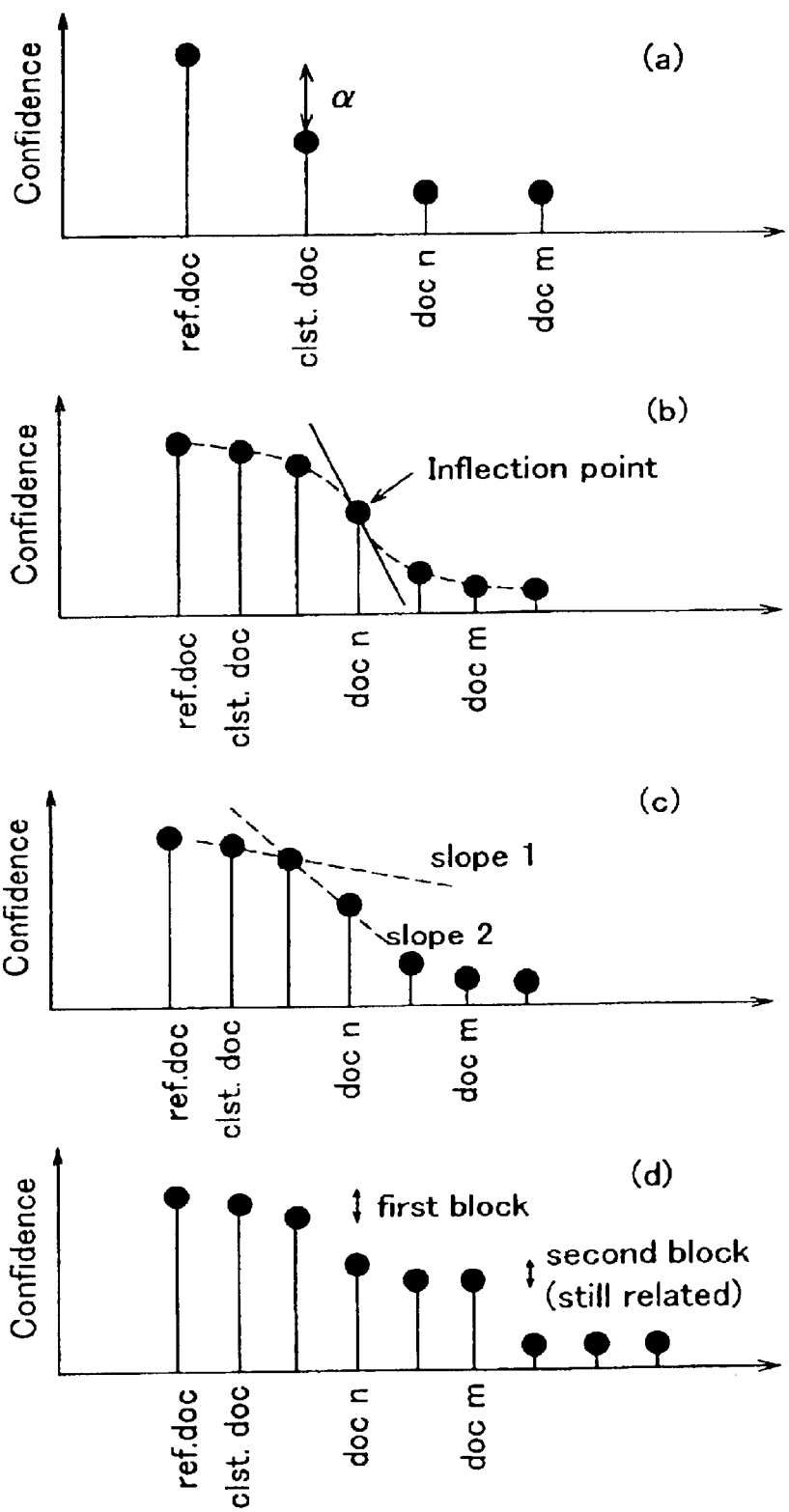
FIG. 12 shows variations for categorizing the topics with respect to their relevancy.

The method of the present invention may also pick up (i.e., identify) the top ten events from the search result as usual search engines do, however various procedures and processes may be possible to pick up the new events and/or classes by incorporating the temporal parameter into the combined matrix as date/time stamps. FIG. 12 shows such variations for ranking the documents with respect to the relative relevancy to the specific time/date stamp. In FIG. 12, the document "ref.doc" has just the time/date stamp included in the query. The document which has the closest relevancy with respect to the ref.doc is represented, for example, by "closest doe". Other documents are represented by doc n and doc m. These documents may be searched from the database by the queries with and without including the time/date stamp.

FIG. 12(a) describes the method wherein the pick-up of the documents are performed until the difference of the confidences between the ref.doc and the document to be picked up last becomes the predetermined difference α. The value of α may be fixed to a predetermined value, or may be selected to any values depending on purposes and needs of a searcher.

FIGS. 12(b) and 12(c) show other methods for picking-up the documents from the search results. In FIG. 12(b), the inflection point of a confidence-document curve is first determined and the data will be picked up from the data having equal or higher rank than the inflection points. Any algorithms and processes well-known in the art may be applied when executing the above procedure. In FIG. 12(c), another embodiment for this method is described. The method described in FIG. 12(c) first determines a threshold F for the difference of two slopes derived from three adjacent documents in the confidence-document curve. The pick-up of the data will be terminated at the point where the difference between slope 1 and slope 2 exceeds a predetermined value:

$$\text{Acceleration} = |\text{slope 1} - \text{slope 2}| > \epsilon$$

The value of $\epsilon$ is not substantially limited and may be optimized so as to pick up desired numbers of the documents.

FIG. 12(d) shows a method for categorizing the documents depending on relative relevance therebetween. In this method, the documents are grouped to the first block, second block and third block of the documents, for example, by sudden decrease of the confidences between the adjacent documents. The method which uses the inflection points and the difference in the slopes as described in FIGS. 12(b) and 12(c) will be effective in order to categorize the documents, and these procedures may be combined to evaluate the relative relevance of the documents.

Procedure for Detection of New Event

A. Construction of a Mathematical (vector space) Model of Documents in a Database Each document, e.g., electronic text document and/or Web page news articles in a database is represented by a vector using attributes included in the documents such as author, name of source, and/or keywords in an electronic text document. When creating the vector representation, well-known refinement techniques for ensuring proper weighting of the attributes may be applied to the documents. Such refinement techniques are as follows:

(1) Concatenation of singular and plural forms of words;
(2) Removal of sensitivity to letters (capital/lower case);
(3) Weighting with respect to frequency of appearance; and
(4) Removal of words which appear infrequently or too frequently, e.g., words appearing less than three or more than 100 occurrences.

B. Construction/creation of the Document Matrix Including the Time/date Stamp Corresponding to the Temporal Attribute for each Document The date/time stamp is then incorporated into the document matrix to create the combined matrix in the described manner so as to treat the date/time stamp simultaneously with keywords in the search. The detail of the incorporation of the date/time stamp to the document matrix has been described hereabove.

C. Define "New Event" Using Distances Between the Documents.

For detection of a new event, first a distance between two documents is defined using a function such as cosine of the angle defined by the two corresponding document vectors. This distance may be obtained by the scalar product of the document vectors in accordance with any conventional manner, however, the combined vectors include the information relating to the time/date stamp, thereby permitting evaluation of the distance between the documents having the same keywords simultaneously.

Here, assume that two documents have the same keywords when only the keyword attributes are compared. The distance between such documents is conventionally determined to be zero because the documents have the same keywords, and therefore, another clustering for detection of new events must be required. In the method according to the present invention, the distance between the two documents having the same keywords may be possible to have a non-zero value because the combined vector includes the date/time stamp simultaneously. The distance between the two combined vectors is typically classified as follows:

Follow-up Article

If the two documents are recorded within a period "dt", then the document with more recent time/date stamp should be considered as a "follow-up article" to the earlier document.

New Event

If the two documents are recorded at times separated by a temporal distance greater than "dt", then the document with the more recent time stamp is considered as a document on a "new event".

The actual value of "dt" may be optimized considering various kinds of topics, a purpose of search, requirements by uses, etc. It may be possible to use a function, i.e., a temporal window about the time/date stamp which varies from one to zero within the time period "dt" smoothly and then directly indicate the "follow-up article", for example, by making the scalar product between the combined vector and the temporal window function.

D. Temporal Window

Figure 13:
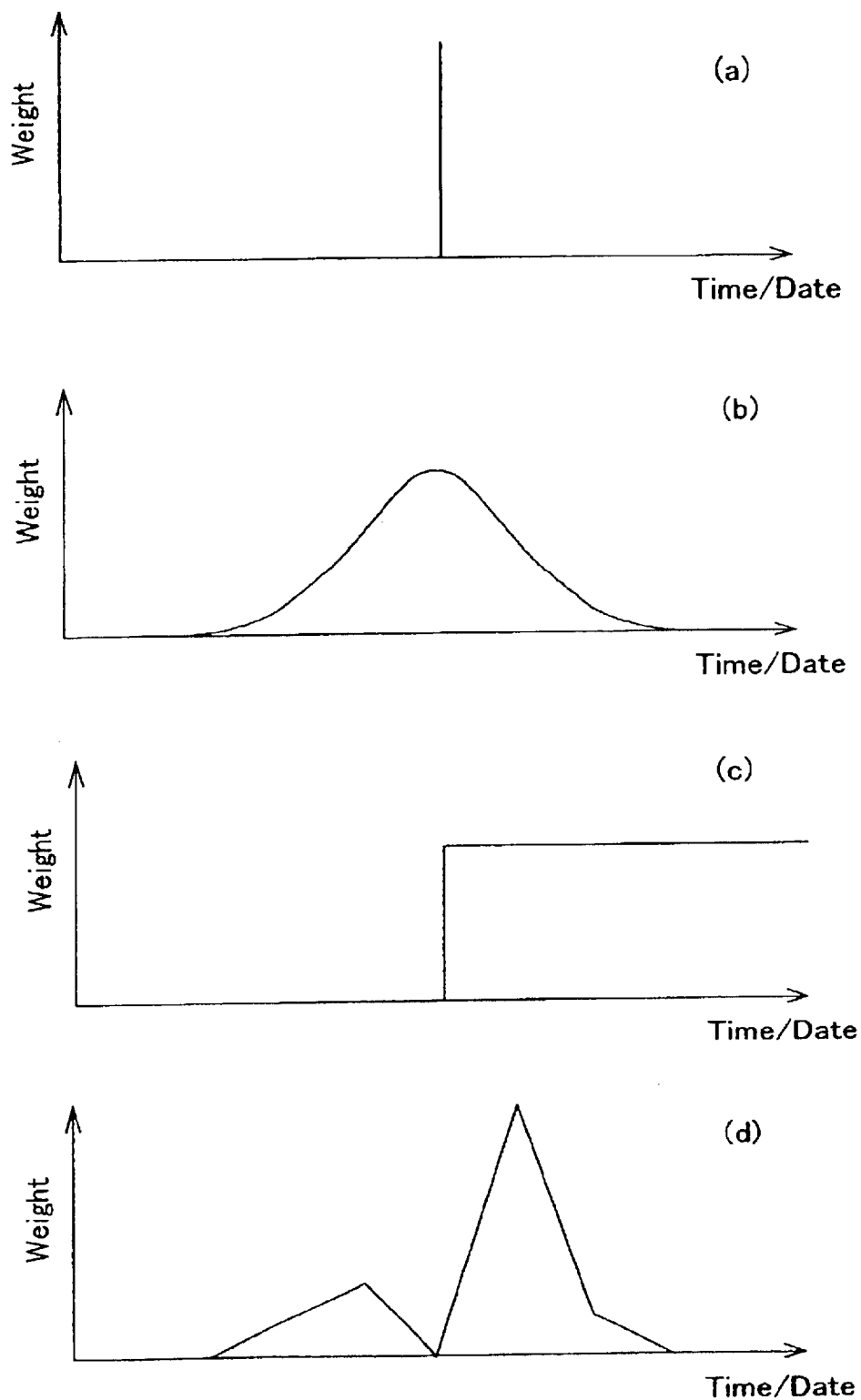
FIG. 13 shows several types of the temporal window.

Several types of the temporal window embodied according to the present invention are depicted in FIG. 13. In FIG. 13, the ordinate represents weighting factor and the abscissa represents time elapse about the specific date for the new event. The temporal windows used according to the present invention are selected from the group consisting of the symmetric Gaussian function, the delta function, the step function, a Heaviside step function, and the p temporal window which may be interactively input by users. The temporal window is useful both in detecting new events and/or classes and in tracking evolution of new events in a database.

FIG. 13(a) shows the temporal window represented by the delta function. This temporal window may be effective to determine the events occurring on a specific time/date.

FIG. 13(b) shows the temporal window in the symmetric Gaussian function. This temporal window has the highest weighting factor on the date for the new event, and has weight gradually decreasing with respect to the distance from the specific date. This type of temporal window may be effective, for example, when a certain time/date of the new event is somewhat ambiguous or when a user wishes to know topics around the specific date and/or when tracking of follow-up articles is carried out. The Gaussian function may be used with and without normalization in the present invention, however, the Gaussian function may be preferably used in the normalized form. A plurality of temporal windows in the form of the Gaussian functions may be embodied in the present invention to simultaneously track events on week, month, and annual bases.

FIG. 13(c) shows the temporal window in the step function having the weighting factors to be zero before the specific time and/or date and constant weighting factors for events after the specific time and/or date. This temporal window is effective to track topics occurring after the specific event or time and/or date. The temporal window having a weighting factor of zero after the specific time and/or date and a constant weighting factor before the specific date, i.e., "Heaviside step function" may be used, for example, when a searcher ensures that the event is first occurred on the specific time and/or date.

FIG. 13(d) shows the temporal window which is input by a user interactively through a computer system. The temporal window shown in FIG. 13(d) may be altered by the user so as to detect and track a desired event. This alternation on the temporal window may be achieved interactively in any way well-known in the art through a keyboard, a stylus, a mouse or some kind of pointing device.

The above described temporal windows may be implemented to the present invention in any combinations depending on purpose of the detection and tracking. When the number of said keywords in each document is relatively constant in said database and the same temporal window is used for all of the documents, the temporal window may be normalized before dimensional reduction for said vectors is carried out.

Procedure for Tracking Evolution of Events in a Database

The constructions of the document vectors and the combined vectors was explained in foregoing paragraphs A and B (in the section entitled "Procedure for Detection of New Events"), and therefore, is not explained in detail in this section and essential procedures for the tracking will be explained.

A. See paragraph A in previous section.

B. See paragraph B in previous section.

C. Compute the "Distance" Between Two Documents Using the Temporal Window

The distance between the two documents is defined as the cosine of the angle between the two corresponding combined vectors as described above. Next, a "window" about the date/time stamp may be applied to each combined vector to determine the documents which address the same keywords and were created on or near the same time, or are closer to each other than those which address the same topic but were recorded far apart in time.

D. Define the Notion of "Documents Covering the Same Event"

The two documents may be defined to be "covering the same event" when the distance between the corresponding document vectors is small. The threshold for what is small may be determined by a searcher, and there is no substantial limitation thereto. "Small" can be defined in absolute quantitative terms and/or changes in the ranking versus relevancy curve, i.e., the slope of the ranking versus confidence curve when one of the documents is input as a query vector in a database.

E. Track Anniversary of Events

To track anniversaries of events, e.g., weekly, monthly, and annually, another window such as an "anniversary window" around the time of the anniversaries of interest as well the temporal window around the time/date stamp may be incorporated. The above anniversary window may be applied in the tracking as the temporal window, whereas its time duration must be set for each anniversary.

F. Track Only Events Which Occur Before a Specified Date (or after a specified date)

To track only events which occur before a specified date, a Heaviside "step function" which takes on the value one before the date and becomes zero after the date may be effective. When a precise date has some ambiguity, or when the delay time before a news report is submitted and posted must be taken into account, a "softer curve" which transfers unity to zero more gradually may also be used. The transfer of the softer curve may be selected according to a specific case of concern and there is no substantial limitation thereto. When tracking evolution of the events which occur after a specific date, a step function which is zero before the date and becomes unity after the date may be used as the temporal window. Both step functions may be, of course, modified so as to take into account the ambiguity of the date, etc.

G. Reducing Noise in the Data

To reduce the noise in the data and to take into account polysemy and synonymy, an appropriate clustering algorithm may be used to determine the inter-relationship ranking and % relevancy of a specified document to others in the database. Such algorithm may include a latent semantic indexing, but not limited thereto, for example, see M. Berry, S. Dumais, G. O'Brien, "Using linear algebra for intelligent information retrieval", SIAM Review, Vol. 37, No. 4, pp. 573–595, December, 1995, and S. Deerwester et al., "Indexing by latent semantec analysis", Journal of the American Society for Information Science, Vol. 41, No. 6, pp. 391–407 (1990), although sometimes two documents related to the same event may fail to be identified as being relevant to each other using the algorithm above. However, when enough documents on the topic exist in the database concerned, such error may be recovered in the method according to the present invention.

Computer System

Figure 14:
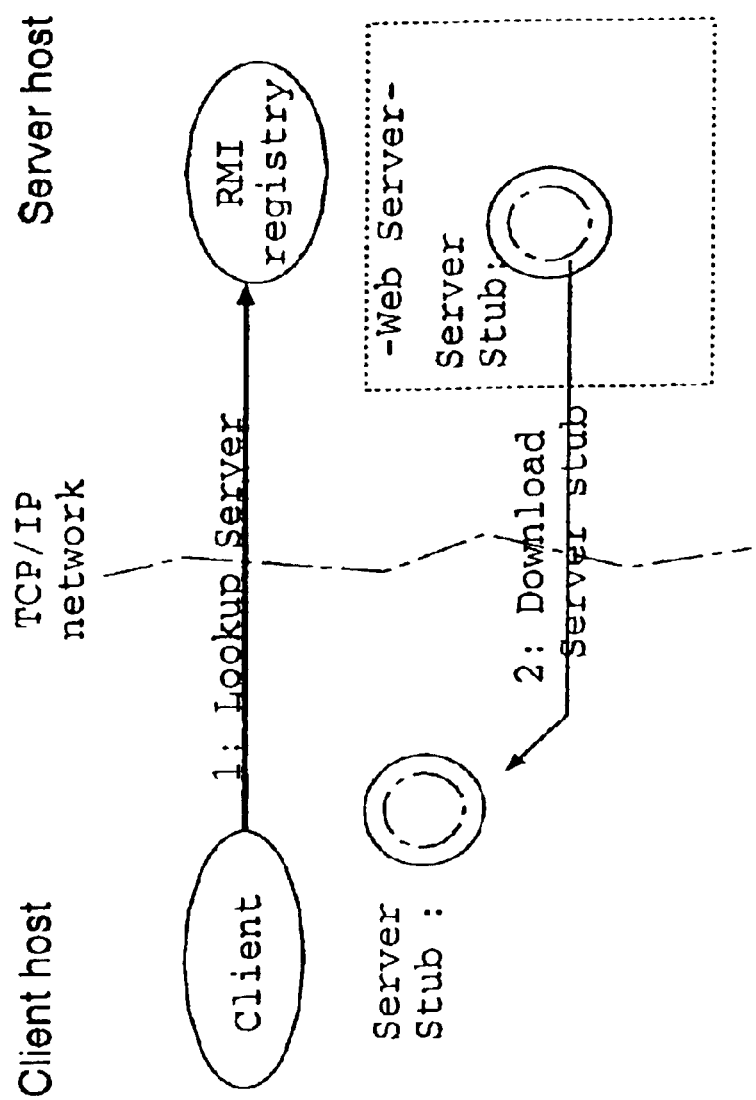
FIG. 14 shows a representative computer system embodying the method according to the present invention.

Referring to FIG. 14, a representative embodiment of the computer system according to the present invention is described. The computer system according to the present invention may include a stand alone computer system, a client-server system and/or LAN/WAN communicated with any conventional protocols, or a computer system included communicated through an Internet infrabase. In FIG. 14, the representative computer system effective in the present invention is described using client-server systems.

The computer system shown in FIG. 14 compromises at least one client computer and server host computer. The client computer and the server host computer are communicated through a communication protocol of TCP/IP, however any other communication protocols may be available in the present invention. As described in FIG. 14, the client computer issues a request 1 to RMI registry of the server host computer to carry out the search of the new events/classes of the documents stored in memory means of the server host computer.

The server host computer executes detection and/or tracking of the database depending on the request from the client computer. A result of the detection and/or tracking is then downloaded by the client computer from the server host computer through the server stub so as to be used by a user of the client computer. In FIG. 14, the server host computer is described as the Web server, but is not limited thereto; server hosts in any other types may be used in the present invention so far as the computer system provides the above described function.

Figure 15:
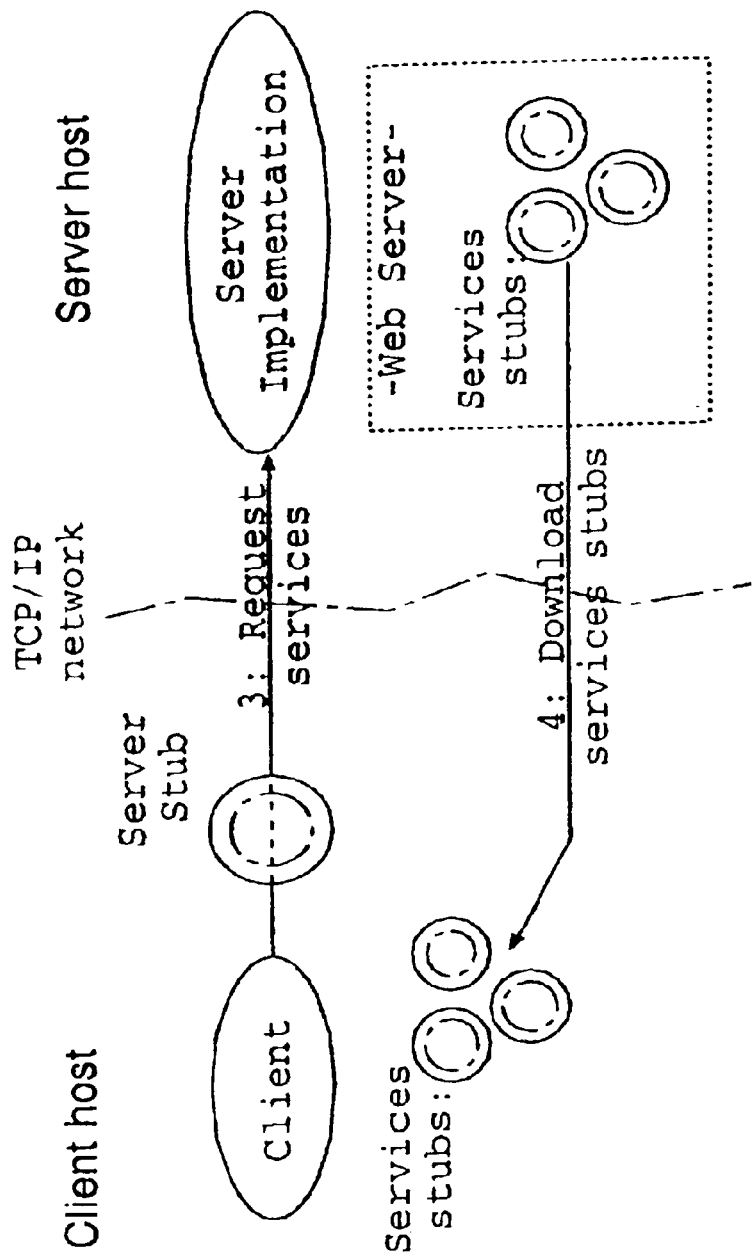
FIG. 15 shows a representative computer system embodying the method according to the present invention.

FIG. 15 shows another embodiment of the computer system. In FIG. 15, the client computer issues the request 3 for detecting and tracking the new events and/or classes to a service agent through a network communicated with TCP/IP, of course, protocols other than TCP/IP may be used in the present invention. The server host computer to which the program for executing the method of the present invention is implemented starts the detection and tracking upon receiving the request from the client. In FIG. 15, the search results are downloaded by a service agent and then transmitted to the client computer through service stubs of the Web server.

Figure 16:
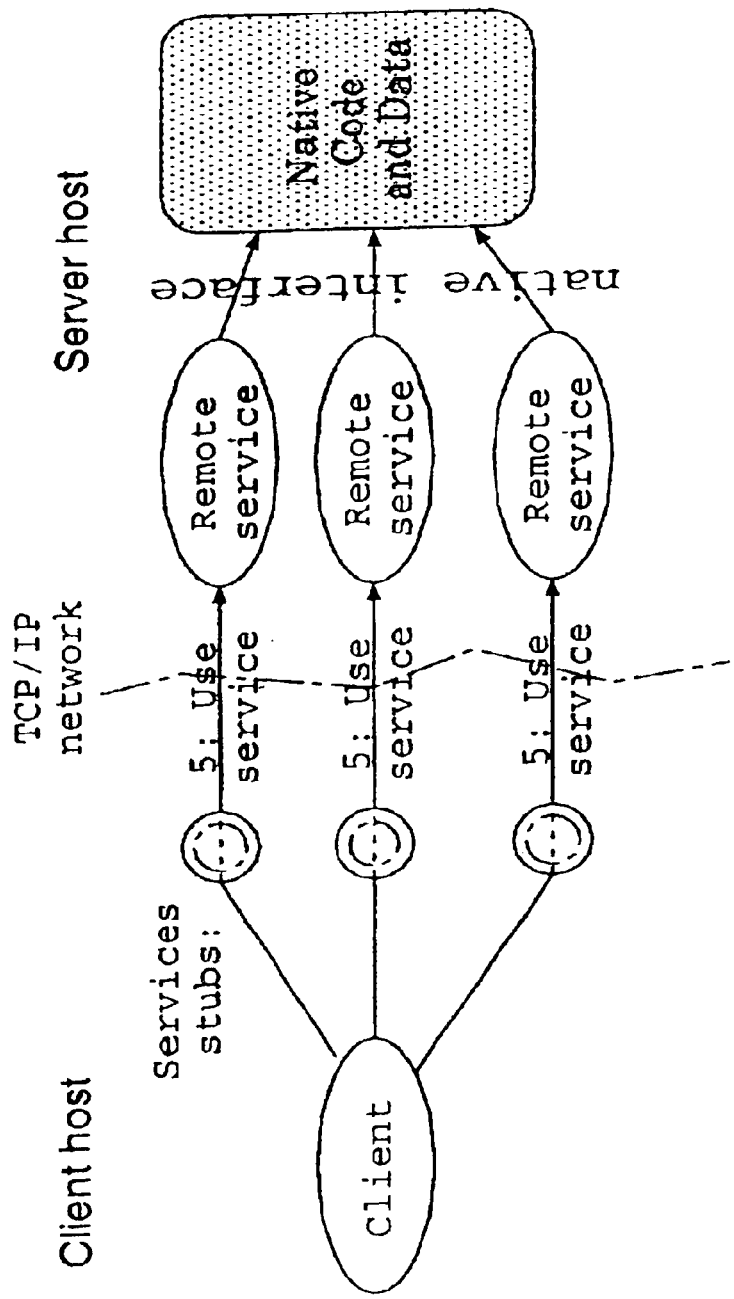
FIG. 16 shows a representative computer system embodying the method according to the present invention.

FIG. 16 shows another embodiment of the computer system according to the present invention. In the embodiment shown in FIG. 16, client computers communicate to each of a plurality of remote service agents independently through the network with TCP/IP. Each of the remote service agents issues the requests 5 for the detection and tracking to the server host computer placed at a provider of data, such as Reuters, etc., through a native interface accessing to each request from the clients. The server computer of the data provider stores a native code and data within memory means and starts the program for detection and/or tracking of the new data and/or classes upon receiving the request 5 from the client. When the search results are obtained, the results are returned to each remote service agent and further communicated to each of the clients originally issuing the requests 5. As described above, the embodiments of FIGS. 14–16 have been explained using networked computer systems. Of course, the present invention may be effective in a stand alone computer system into which a very large database is implemented.

Figure 17:
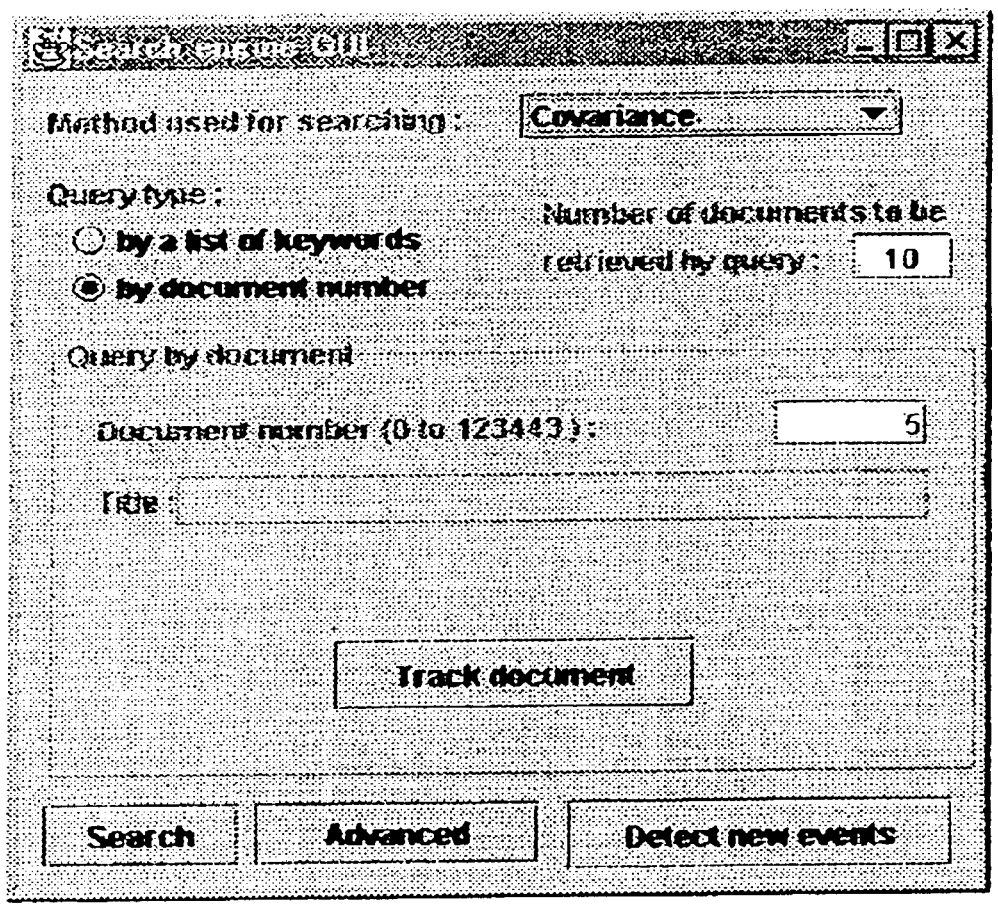

Embodiments for executing the procedure of the present invention will be explained using FIGS. 17–21 which represent GUI displays when the computer system runs the procedure according to the present invention, but the invention is not limited thereto; other various suitable GUI may be possible in the present invention. A sample GUI shown in FIG. 17 is the GUI for a search by document number, and the field for selecting the method for the search "Method used for searching", the field for selecting the query type "Query type", the field for inputting number of documents to be retrieved "Number of documents to be retrieved by query", and the field for inputting query type "Query by document" is provided thereto. A user may input such information into the corresponding field thereby initializing the search conditions.

Figure 18:
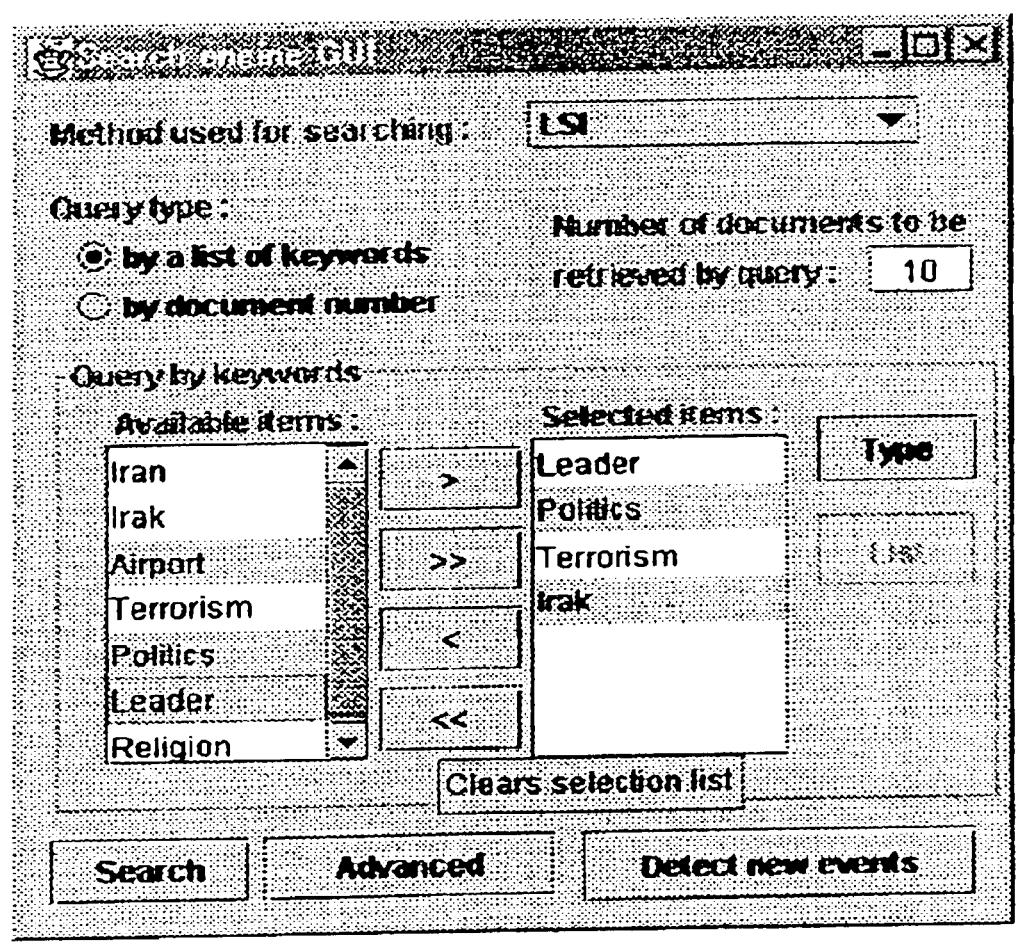
Figure 19:
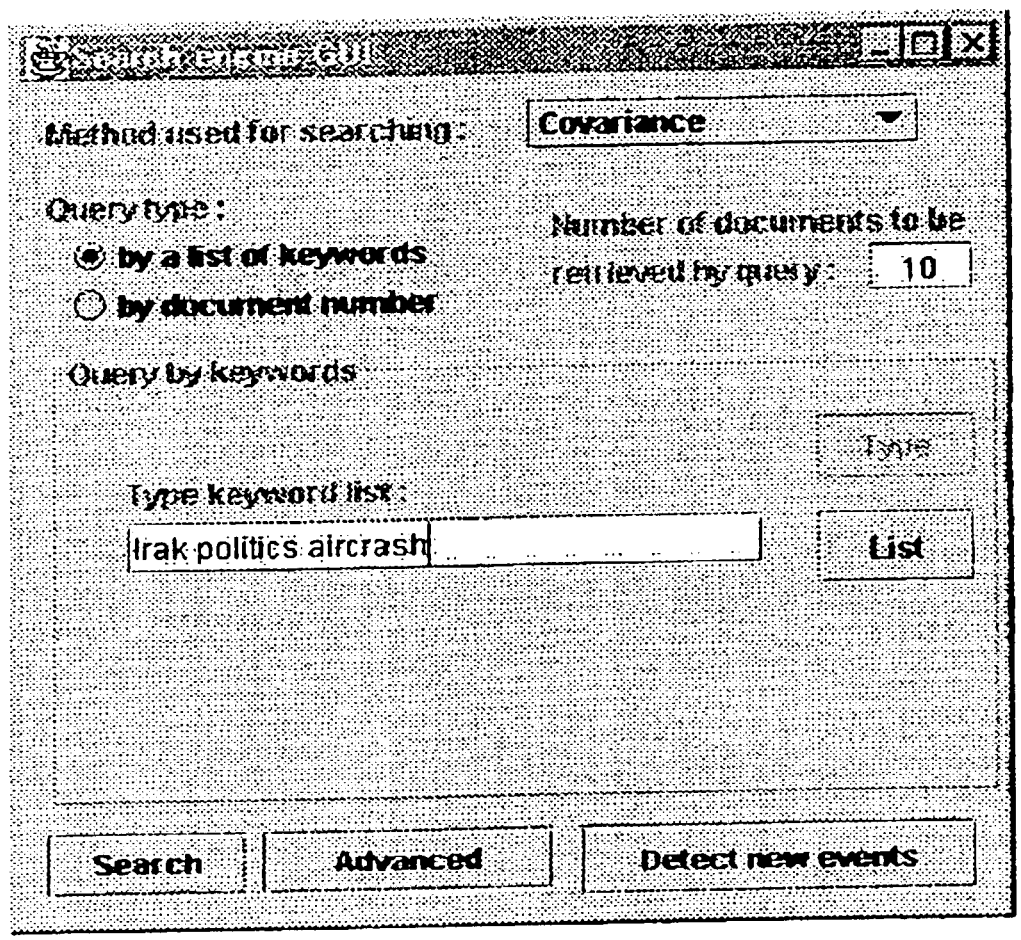

In FIG. 18, a sample GUI for the keyword search is depicted. In the sample GUI shown in FIG. 18, a user selects "by a list of keywords" from the field of "query type", and the user is allowed to select the keywords from the fields. The keywords may be selected among the predetermined keywords and/or may be input by the user for a specific purpose. FIG. 19 shows an embodiment for inputting the keywords into the field of the keyword list. In the embodiment shown in FIG. 19, the field for inputting the keyword is open and the user is allowed to input his/her desired keywords therein in a predetermined format.

Figure 20:
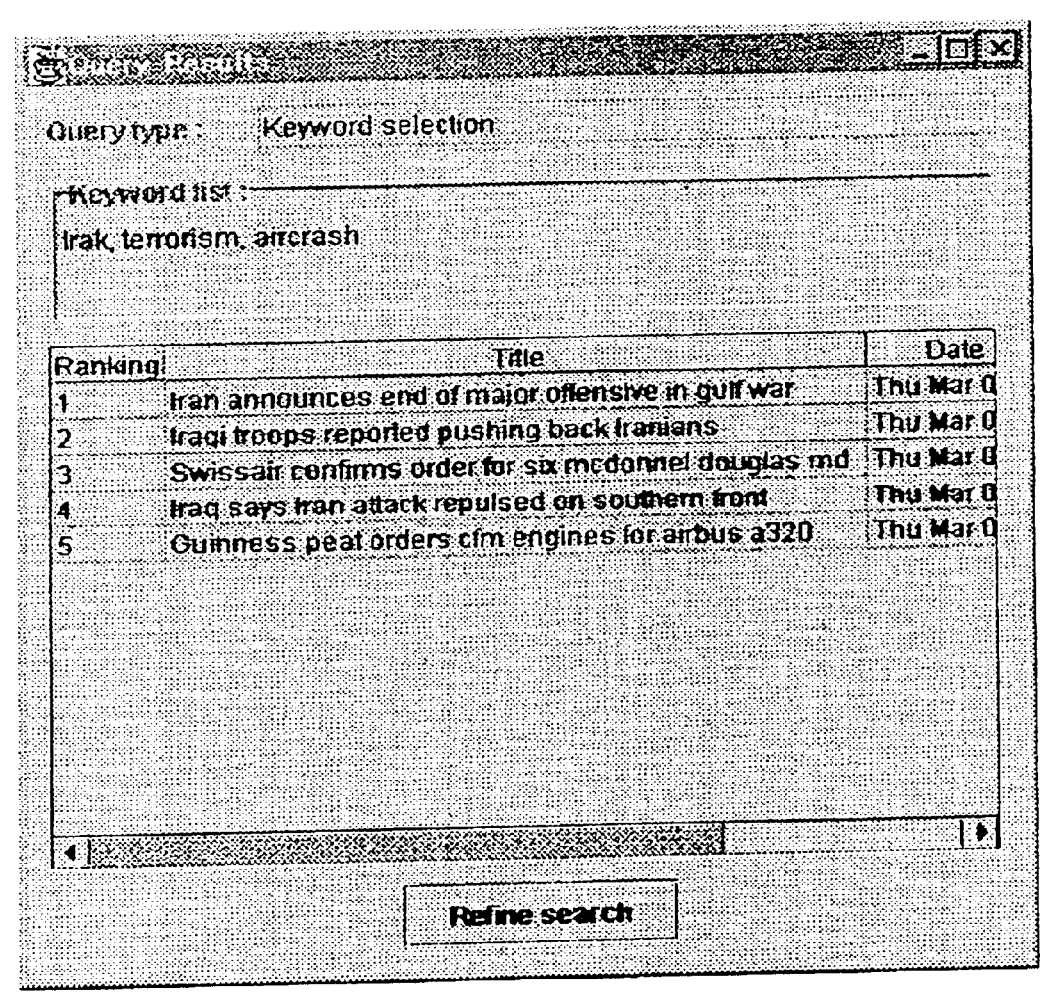

A typical GUI for displaying the result of the search is shown in FIG. 20. The query type, and the keywords used in the search are displayed in the fields opened above the field for displaying the results. The search results are displayed with the ranking thereof, the title of the event detected and/or tracked, and the date. The results may be hard-copied from printer means in an appropriate format.

The user of the search engine to which the method according to the present invention is embodied may input his/her desired temporal window interactively moving selection means such as selection bars in the illustrated embodiments for the weight and the time/date stamp with suitable means such as a keyboard, a stylus, a mouse or other pointing devices so as to obtain customized results for a specific purpose.

Figure 21:
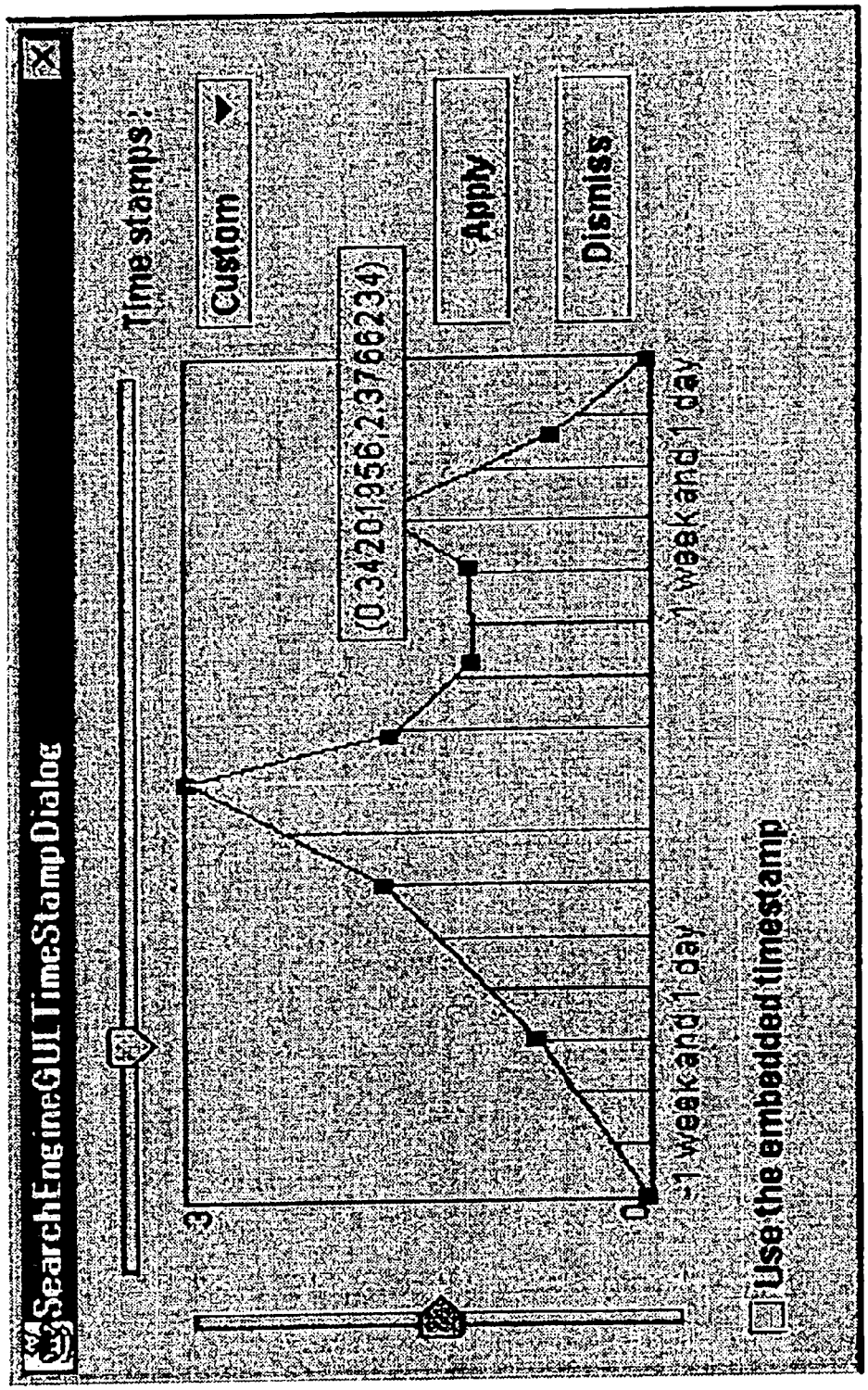

FIG. 21 shows an embodiment of a GUI for altering the temporal window in which a width of the temporal window, specific temporal parameters such as time, date, or year are displayed in the GUI. A user of the system may input the specific temporal window as shown in FIG. 21 interactively so as to obtain more precise and confident search results guided by the numerical displays for the temporal window.

Hereunder, the present invention will be further explained by non-limiting examples thereof.

EXAMPLES

Sample Database

The present invention was tested using sample databases extracted from a Reuters-21578 news database; one database contained 83 articles and the other database contained over 20,000 articles, respectively.

The database of 83 articles from the larger Reuters database was set to examine effectiveness of the present invention, and the articles were selected from new events, subsequent follow-up articles, articles on isolated new events, and irrelevant "noise", i.e., articles with no bearing on the main subjects which are listed as below:

planes (airbus, boeing, douglas)

plane crash and takeover earthquake (New Zealand, Japan)

computers (att, ibm, apple)

gulf war

British elections noise

The sample database is listed in Table II (83 news).

TABLE II

New Events Detected

| No | Date | Document title | Algo | Result |
|---|---|---|---|---|
| 0 | 19870226 | iran announces end of major offensive in gulf | NEW | OK |
| 1 | 19870226 | britain s alliance opposition wins by-election | NEW | OK |
| 2 | 19870227 | british conservatives ahead of labour in new polls | NEW | OLD |
| 3 | 19870227 | iran claims new victories near basra | | |
| 4 | 19870301 | strong earthquake hits new zealand | NEW | OK |
| 5 | 19870301 | apple computer upgrades macintosh line | NEW | OK |
| 6 | 19870302 | apple offer ms-dos products | NEW | OLD |
| 7 | 19870303 | earthquakes continue to shake northern new zealand | OLD | OK |
| 8 | 19870303 | apple lt aapl expands network capabilities | OLD | OK |
| 9 | 19870303 | airbus signs one billion dlr japanese contract | NEW | OK |
| 10 | 19870304 | amr corp orders 40 jets from airbus and boeing | | |

TABLE II-continued

New Events Detected

| No | Date | Document title | Algo | Result |
|---|---|---|---|---|
| 11 | 19870304 | earthquakes continue in northern new zealand | OLD | OK |
| 12 | 19870304 | iran reports offensive as iraq threatens air raids | NEW | OK |
| 13 | 19870305 | iran reports heavy fighting in iraqi kurdistan | | |
| 14 | 19870306 | iraq says it crushes new iranian basra offensive | | |
| 15 | 19870307 | national oppostion ahead in n z opinion poll | NEW | OK |
| 16 | 19870309 | gencorp to sell los angeles television station to disney | NEW | OK |
| 17 | 19870311 | iran claims 3,000 iraqi casualties in fighting | NEW | OK |
| 18 | 19870312 | iraq says it crushed iranian attack in north | | |
| 19 | 19870313 | iraq says it crushed iranian attack in north | OLD | OK |
| 20 | 19870314 | iraq says iran attack repulsed on Southern front | | |
| 21 | 19870314 | new uk poll says tories have six-point lead | | |
| 22 | 19870315 | new uk poll says tories have six-point lead | OLD | OK |
| 23 | 19870315 | thatcher party has nine point poll lead | | |
| 24 | 19870316 | thatcher party has nine point poll lead | OLD | OK |
| 25 | 19870316 | zimmer lt zim boosts credit line by 4 3 mln dlrs | | |
| 26 | 19870318 | japan earthquake kills one cuts phone lines | NEW | OK |
| 27 | 19870318 | japan earthquake kills one cuts phone lines | OLD | OK |
| 28 | 19870318 | iraq say it attacks two ships in gulf | NEW | OK |
| 29 | 19870318 | iraq says it hit ship in gulf off iran today | OLD | OK |
| 30 | 19870322 | swissair confirms order for six mcdonnell douglas md-11 | NEW | OK |
| 31 | 19870319 | swissair orders six mcdonnell douglas md-11 jets | | |
| 32 | 19870322 | hussein says iran's year of decisiveness foiled | | |
| 33 | 19870323 | coca cola spokesman said rumors coke seeking takeover | NEW | OK |
| 34 | 19870324 | coca cola says rumors incorrect | OLD | OK |
| 35 | 19870324 | iraq reports attacks on supertanker oil targets | NEW | OK |
| 36 | 19870323 | iraq reports attacks on supertanker oil targets | OLD | OK |
| 37 | 19870324 | us offers to escort kuwaiti tankers in gulf | NEW | OK |
| 38 | 19870324 | att introduces new computer hardware software networking | NEW | OK |
| 39 | 19870325 | att lt t introduces new computer products | OLD | OK |
| 40 | 19870325 | mcdonnell douglas gets 30 6 mm dlr contract | NEW | OK |
| 41 | 19870325 | uk poll shows surge for centrist alliance parties | NEW | OK |
| 42 | 19870326 | britain s centrist alliance gains in latest poll | OLD | OK |
| | | — 10 days break — | | |
| 43 | 19870405 | technology ibm's new computer nervously awaited | | |
| 44 | 19870405 | att lt t forms computer sales groups | | |
| 45 | 19870405 | grumman lt gq unit wins mcdonnell douglas order | | |
| 46 | 19870405 | ibm introduces four new personal computers compatible | | |
| 47 | 19870406 computers | ibm lt ibm introduces new personal | OLD | OK |
| 48 | 19870406 | northwest airlines to buy up to 20 airbus a340 jets | NEW | OK |
| 49 | 19870407 | northwest airlines orders long-range airbus jet | | |

TABLE II-continued

New Events Detected

| No | Date | Document title | Algo | Result |
|---|---|---|---|---|
| 50 | 19870407 | british opinion polls confirm thatcher lead | | |
| 51 | 19870408 | british opinion polls keep conservatives ahead | | |
| 52 | 19870408 | bahrain treasury bills yield average 6 00 pct | | |
| 53 | 19870408 | iraq say iran offensive on southern front checked | | |
| 54 | 19870409 | british opinion polls keep conservatives ahead | OLD | OK |
| 55 | 19870409 | strong quake jolts central japan | | |
| 56 | 19870410 | british opinion polls keep conservatives ahead | OLD | OK |
| 57 | 19870410 | iraq says iran offensive on southern front checked | OLD | OK |
| 58 | 19870410 | thatcher firm as pressure mounts for elections | | |
| 59 | 19870410 | bankers trust lt bt puts brazil on non-accrual | | |
| 60 | 19870411 | jal boeing crash caused by faulty repairs-report | NEW | OK |
| 61 | 19870411 | iran says offensive aimed at destroying iraqi army | NEW | OK |
| 62 | 19870411 | conservative lead drops in new u k opinion poll | | |
| 63 | 19870412 | iraqi troops reported pushing back iranians | | |
| 64 | 19870412 | airbus signs accord on cfm engine for a 340 plane | | |
| 65 | 19870412 | iran says it opens new offensive north of baghdad | | |
| 66 | 19870413 | iran says it opens new offensive north of baghdad | OLD | OK |
| 67 | 19870413 | israeli helicopters raid south lebanon radio | | |
| 68 | 19870414 | new gulf fighting not a major offensive us | OLD | OK |
| 69 | 19870414 | guinness peat orders cfm engines for airbus a320 — 10 days break — | | |
| 70 | 19870425 | latest bristish poll has thatcher still way ahead | NEW | OK |
| 71 | 19870427 | new poll puts british conservatives well ahead | | |
| 72 | 19870601 | gull lt gll gets mcdonnell douglas lt md contract | | |
| 73 | 19870601 | uk conservatives lead labour by seven points poll | | |
| 74 | 19870602 | mcdonnell douglas lt md gets big thai air order | | |
| 75 | 19870602 | japan report says faulty repairs caused jal crash — 10 days break — | | |
| 76 | 19870615 | technology alternatives to ibm software standard | NEW | OK |
| 77 | 19870615 | chances of direct u s iran gulf clash seen low | NEW | OK |
| 78 | 19871020 | ibm lt ibm adds to system 36 product line | NEW | OK |
| 79 | 19871020 | coca cola enterprises inc 11 cce 3rd qtr net | OLD | NEW |
| 80 | 19871025 | att lt t plans computer using sun lt sunw o chip | | |
| 81 | 19871025 | iran warns u s against raising tension in gulf | NEW | OK |
| 82 | 19871025 | klm denies press report of air atlanta takeover | NEW | OK |

Keywords

A keyword list was generated by looking for words which contained an uppercase letter (capital) in any position in the word. We found a set of simple keywords can provide sufficient results, however, better results may be provided when a better set of keywords may be selected. Words with too frequent or too infrequent occurrences were eliminated from the keyword list for ensuring the accuracy of the search. Then a keyword list including approximately 150 words was constructed by taking into account only the keywords which contain an uppercase (capital) letter in the words whether or not the capital letter can occur in the top and/or middle of the word, hence the capital letter does not necessarily have to be the first letter of the word.

Results From Detecting New Events

Example 1

The results from detection of new events are also listed in the right two columns in Table II. The second column from the right lists the determination from the algorithm according to the present invention, and the term "NEW" represents that the algorithm determined the topic to be new, and the term "OLD" represents that the algorithm determined the topic to be old. The right most row represents judgements for the determination given by the algorithm. In the right most row, the terms "OK" represent that the determination was correct, and in turn the terms other than "OK" denote that the determination was incorrect. As shown in Table II, the determinations made by the algorithm are almost all correct except for Document No. 2, 6, and 79, however, the determination was carried out with sufficient accuracy when one considered the noise data was incorporated into the sample database.

Results From Tracking Experiments

When tracking the evolution of the new events, the relevance of all documents d(i) created after a document d(new) describing a new event for its "closeness" to d(new) was tested at 222. If d(i) had a relevance higher than the threshold e which was designated by a user as determined at 223, then the document d(i) was labeled as a follow-up document for d(new) and added to the list of d relevant(i) at 224 If d(i) has a relevance lower than $\epsilon$, then d(i) was not considered as a follow-up document for d(new) and proceeds to evaluation at 225.

After all documents were tested directly for their relevance with respect to d(new), then the set of documents d_relevant(i) which had a relevancy higher than $\epsilon$ with respect to d(new) was determined. All documents d_relevant2 (j) which were highly relevant to each d_relevant(i) were taken into account in the tracking experiments. If the product of each relevancy for a document d_relevant2 (i) is higher than a relevancy threshold $\epsilon \times \eta$ ($\eta$: attenuation factor) as determined at 225, then d_relevant2 (j) was also considered to be a follow-up document for d(new) and added at 224. All others with lesser relevance are ignored at 226.

Figure 22:
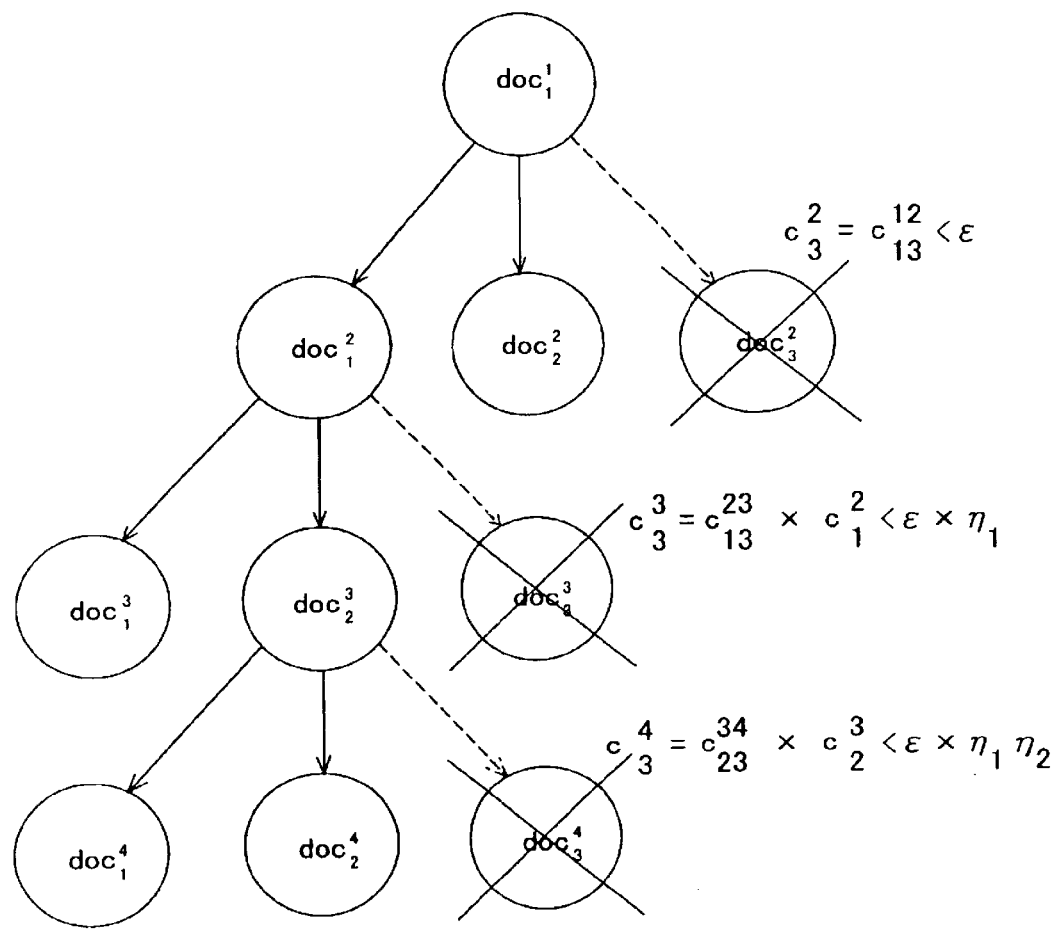
FIG. 22 shows a procedure for taking into account the relevancy between documents.

The above procedure is summarized in FIG. 22.

Progressive layers of documents d_relevant3(k), d_relevant4(l), etc., shown in FIG. 22 were tested to check whether the progressive layers should be considered as the follow-up documents for d(new). For each layer an additional attenuation factor $\eta$ was multiplied by the threshold value. The documents connected by broken lines in FIG. 22 were regarded not to be relevant in present examples. In the present example, the attenuation factor $\eta$ has the same value in each layer. The user of the search engine of which the method according to the present invention is embodied may instead input his/her desired attenuation factors for each layer, i.e., $\eta_{one}$ for the first layer, $\eta_{two}$ for the second layer and so forth for successive layers.

Example 2

To facilitate the detection of new events and tracking their evolution, the temporal window was placed in the appropriate position about the date/time stamp for the date in each document vector.

In this example, the $\epsilon$ (threshold) and $\eta$ (attenuation) were set to 0.3 and 0.9, respectively.

QUERY: 4 19870301 strong earthquake hits New Zealand

The result is listed in Table III

TABLE III

| Rank | No | Date | Document title | Result |
|---|---|---|---|---|
| 1 | 4 | 19870301 | strong earthquake hits new zealand | OK |
| 2 | 7 | 19870303 | earthquakes continue to shake northern new zealand | OK |
| 3 | 11 | 19870304 | earthquakes continue in northern new zealand — second choice — | OK |
| 4 | 55 | 19870409 | strong quake jolts central japan | |

Example 3

In this example, the same procedure described in Example 2 was adopted while the $\epsilon$ (threhold) and $\eta$ (attenuation) were set to 0.3 and 0.44, respectively, and therefore, a sensitivity on the follow-up articles was lowered relatively with respect to Example 1.

QUERY: 0 19870226 Iran announces end of major offensive in gulf war

The result is listed in Table IV.

TABLE IV

| Rank | No | Date | Document title | Result |
|---|---|---|---|---|
| 1 | 0 | 19870226 | iran announces end of major offensive in gulf war | OK |
| 2 | 3 | 19870227 | iran claims new victory near basra | OK |
| 3 | 63 | 19870412 | iraqi troops reported pushing back iranians — second choice — | OK |
| 4 | 20 | 19870314 | iraq says iran attack repulsed on southern front | OK |
| 5 | 67 | 19870413 | israeli helicopters raid south lebanon radio | OK |
| 6 | 68 | 19870414 | new gulf fighting not a major offensive us | OK |
| 7 | 18 | 19870312 | iraq says it crushed iranian attack in north | OK |
| 8 | 19 | 19870313 | iraq says it crushed iranian attack in north | OK |
| 9 | 66 | 19870413 | iran says it opens new offensive north of baghdad | OK |
| 10 | 65 | 19870412 | iran says it opens new offensive north of baghdad | OK |
| 11 | 61 | 19870411 | iran says offensive aimed at destroying iraq army | OK |

Example 4

In the example, the same procedure described in Example 2 was adopted while the $\epsilon$ (threhold) and $\eta$ (attenuation) were set to 0.3 and 0.7, respectively, and therefore, a sensitivity on the follow-up articles was set between Example and Example 2.

QUERY 40 19870325 mcdonnell douglas gets 30 6 mln dlr

The result is listed in Table V.

TABLE V

| Rank | No | Date | Document title | Result |
|---|---|---|---|---|
| 1 | 40 | 19870325 | mcdonnell douglas gets 30 6 mln dlr contract | OK |
| 2 | 72 | 19870601 | gull lt gll gets mcdonnell douglas lt md contract | OK |
| 3 | 45 | 19870405 | grumman lt gq unit wins mcdonnell douglas order — second choice — | OK |
| 4 | 73 | 19870601 | uk conservatives lead labour by seven points poll | ERROR |
| 5 | 74 | 19870602 | mcdonnell douglas lt md gets big thai air order | OK |

Example 5

Using the full Reuters-21578 database consisting of over 20,000 documents, a list of "new" documents was generated by looking for documents d(i) which are not relevant with respect to the user-specified threshold $\epsilon$ to any documents created up to 10 days before d(i). Results from the tracking experiment is listed in Table VI and Table VII, wherein Table VI shows answers expected and Table VII shows results obtained in the tracking experiment. As shown in Table VI and Table VII, the result obtained according to the present invention can pick-up the articles expected, and showed that the present invention is effective in such large databases.

TABLE VI

| Date | No | Document title |
|---|---|---|
| 19870316 | 5324 | thatcher party has nine point poll lead |
| 19870315 | 5160 | thatcher party has nine point poll lead |
| 19870407 | 13626 | british opinion polls keep conservatives ahead |
| 19870407 | 13533 | british opinion polls keep conservatives ahead |
| 19870407 | 13416 | british opinion polls keep conservatives ahead |
| 19870301 | 233 | british conservatives ahead of labour in new polls |
| 19870312 | 4165 | u k poll says tories have six-point lead |
| 19870312 | 4069 | new u k poll says tories have six-point lead |
| 19870405 | 13259 | british opinion polls confirm thatcher lead |

TABLE VII

| Rank | Date | No | Document title |
|---|---|---|---|
| 1 | 19870312 | 4069 | new u k poll says tories have six-point lead |
| 2 | 19870312 | 4165 | new u k poii says tories have six-point lead |
| 3 | 19870407 | 13626 | british opinion polls keep conservatives ahead |
| 4 | 19870407 | 13416 | british opinion polls keep conservatives ahead |
| 5 | 19870407 | 13533 | british opinion poiis keep conservatives ahead ----- second choice ----- |
| 6 | 19870316 | 5324 | thatcher party has nine-point poll lead |
| 7 | 19870309 | 3362 | noranda to spin of forest interests into seperate company |
| 8 | 19870315 | 5160 | thatcher party has nine-point poll lead |

The foregoing Examples exhibited good results with respect to the detection of new events and tracking evolution thereof, and therefore, the present invention may provide novel and effective detection and tracking of the database.

As described above, the present invention has been described with respect to the specific embodiments thereof. However, a person skilled in the art may appreciate that various omissions, modifications, and other embodiments are possible within the scope of the present invention.

The present invention has been explained in detail with respect to the method for detection and tracking, however, the present invention also contemplates to include a system for executing the method described herein, a method itself, and a program product within which the program for executing the method according to the present invention may be stored. The true scope can be determined only by the claims appended.

What is claimed is:

1. A method for detecting new events and/or classes of documents and tracking evolution thereof in a database, said new events and/or classes of said documents being added to said database, said documents including attribute data related to a temporal parameter, said method comprising the steps of:
   providing vectors of said documents based on attribute data that includes said temporal parameter, and
   detecting said new events and/or classes of said documents and tracking evolution thereof using said vectors, wherein said tracking comprises evaluating vectors to determine whether said documents relate to new, follow-up, or old events and/or new, follow-up, or old classes.

2. The method according to claim 1, wherein said attribute data include at least one keyword, and said keyword is weighted with respect to a frequency of appearance in said document.

3. The method according to claim 2, wherein said temporal parameter is further weighted with respect to time elapse about a specific date, and a weight of said temporal parameter is less than the total weight of said keywords.

4. The method according to claim 1, wherein said detecting and tracking step further includes a step of providing a temporal window such that said detecting and tracking step is executed using said temporal window.

5. The method according to claim 4, wherein said temporal window is a delta function with respect to a specific date.

6. The method according to claim 4, wherein said temporal window is a symmetric Gaussian function.

7. The method according to claim 4, wherein said temporal window is a step function.

8. The method according to claim 4, wherein said temporal window is formed interactively by a user on a display window.

9. The method according to claim 4, wherein said temporal window is normalized before dimensional reduction for said vectors is carried out if the number of said keywords in each document is relatively constant in said database and the same temporal window is used for all of said documents.

10. The method according to claim 4, wherein several different temporal windows are provided so that the relative weights between said keywords and said temporal parameter becomes relatively constant from document to document if the number of said keywords in each document varies greatly.

11. A computer system including a database to which new events and/or classes of documents are added, said documents including data related to a temporal parameter, for detecting new events and/or classes of said documents and tracking evolution thereof, comprising:
   means for providing vectors of said documents based on attribute data including said temporal parameter including in said document, and
   means for detecting said new events and/or classes of said documents and tracking evolution thereof using said vectors, wherein said tracking comprises evaluating vectors to determine whether said documents relate to new, follow-up, or old events and/or new, follow-up, or old classes.

12. The computer system according to claim 11, wherein said attribute data include at least one keyword, and said keyword is weighted with respect to a frequency of appearance in said documents.

13. The computer system according to claim 12, wherein said temporal parameter is further weighted with respect to time elapse about a specific date, and weight of said temporal parameter is less than the total weight of said keywords.

14. The computer system according to claim 11, wherein said detecting and tracking means further includes means for providing a temporal window such that said temporal window is used by said detecting and tracking means.

15. The computer system according to claim 14, wherein said temporal window is a delta function with respect to a specific date.

16. The computer system according to claim 14, wherein said temporal window is a symmetric Gaussian function.

17. The computer system according to claim 14, wherein said temporal window is a step function.

18. The computer system according to claim 14, wherein said temporal window is formed interactively by a user on a display window.

19. The computer system according to claim 14, wherein said temporal window is normalized before dimensional reduction for said vectors is carried out if the number of said keywords in each document is relatively constant in said database and the same temporal window is used for all of said documents.

20. The computer system according to claim 14, wherein several different temporal windows are provided so that the relative weights between said keywords and said temporal parameter becomes relatively constant from document to document if the number of said keywords in each document varies greatly.

21. The computer system according to claim 11, wherein said computer system comprises a server and at least one client, and said detection and tracking step is requested from at least one client computer which transmits to said server and receives a result from said detection and tracking step.

22. A program product for detecting new events and/or classes of documents and tracking evolution thereof in a database, said new events and/or classes of said documents being added to said database, said documents including attribute data related to a temporal parameter, said method comprising steps of:
   providing vectors of said documents based on attribute data that includes said temporal parameter, and
   detecting said new events and/or classes of said documents and tracking evolution thereof using said vectors, wherein said tracking comprises evaluating vectors to determine whether said documents relate to new, follow-up, or old events and/or new, follow-up or old classes.

23. The program product according to claim 22, wherein said attribute data include at least one keyword, and said keyword is weighted with respect to a frequency of appearance in said documents.

24. The program product according to claim 2, wherein said time temporal parameter is further weighted with respect to time elapse from a specific date, and a weight of said temporal parameter is less than the total weight of said keywords.

25. The program product according to claim 22, wherein said detecting and tracking step further includes a step of providing a temporal window such that said detecting and tracking step is executed using said temporal window.

26. The program product according to claim 25, wherein said temporal window is a delta function with respect to a specific date.

27. The program product according to claim 25, wherein said temporal window is a symmetric Gaussian function.

28. The program product according to claim 25, wherein said temporal window is a step function.

29. The program product according to claim 25, wherein said temporal window is formed interactively by a user on a display window.

30. The program product according to claim 25, wherein said temporal window is normalized before dimensional reduction for said vectors is carried out if the number of said keywords in each document is relatively constant in said database and the same temporal window is used for all of said documents.

31. The program product according to claim 25, wherein several different temporal windows are provided so that the relative weight between said keywords and said temporal parameter becomes relatively constant from document to document it the number of said keywords in each document varies greatly.

* * * * *